United States Patent
Zhou et al.

(10) Patent No.: US 9,918,216 B2
(45) Date of Patent: Mar. 13, 2018

(54) HOME NETWORK DOMAIN SELECTION FOR ROUTING CALL TO A VISITED NETWORK

(71) Applicant: Huawei Technologies Co., Ltd., Shenzhen (CN)

(72) Inventors: Jinghua Zhou, Shenzhen (CN); Shixiang Liang, Shenzhen (CN); Guojun Xie, Shenzhen (CN); Fuxiang Xiong, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/198,079

(22) Filed: Jun. 30, 2016

(65) Prior Publication Data
US 2016/0309318 A1  Oct. 20, 2016

Related U.S. Application Data

(63) Continuation of application No. PCT/CN2014/094842, filed on Dec. 24, 2014.

(30) Foreign Application Priority Data

Dec. 31, 2013  (CN) .......................... 2013 1 0751780

(51) Int. Cl.
*H04W 8/06* (2009.01)
*H04W 8/12* (2009.01)
(Continued)

(52) U.S. Cl.
CPC .............. *H04W 8/06* (2013.01); *H04W 8/12* (2013.01); *H04W 8/26* (2013.01); *H04W 40/20* (2013.01); *H04W 76/026* (2013.01)

(58) Field of Classification Search
CPC ....... H04W 76/026; H04W 8/06; H04W 8/04; H04W 8/08; H04W 8/12; H04W 8/14;
(Continued)

(56) References Cited

U.S. PATENT DOCUMENTS 7,894,593 B2 * 2/2011 Garcia-Martin et al. ........................ 379/221.01
9,131,042 B2 * 9/2015 Song et al. .................... 455/433
(Continued)

FOREIGN PATENT DOCUMENTS

CN  1870777 A  11/2006
CN  1913503 A  2/2007
(Continued)

OTHER PUBLICATIONS

Nortel et al., "Terminating Domain Selection Details," 3GPP TSG SA WG2 Architecture—S2#47, S2-051514, Jun. 27-Jul. 1, 2005, pp. 1-15, Montreal, Canada.
(Continued)

*Primary Examiner* — Meless Zewdu
(74) *Attorney, Agent, or Firm* — Slater Matsil, LLP

(57) ABSTRACT

Embodiments provide a call control device, an HSS, an AS, and a user service processing method. The call control device includes: a receiving module, configured to: receive an access domain confirmation request message, comprising an identifier of the called UE, sent by a call routing device on a home network; a determining module determining, according to the identifier, that the home network communicates with a visited network of the called UE by using a CS domain on the home network; and a sending module sending an access domain confirmation response message, carrying instruction information, to the call routing device and the instruction information is used to instruct the call routing
(Continued)

device to route the call to the visited network by using the CS domain on the home network.

22 Claims, 7 Drawing Sheets

(51) Int. Cl.
*H04W 8/26* (2009.01)
*H04W 40/20* (2009.01)
*H04W 76/02* (2009.01)

(58) Field of Classification Search
CPC ....... H04W 40/20; H04W 8/26; H04W 8/082; H04W 4/02; H04W 76/02; H04W 8/02; H04W 8/18; H04W 8/20; H04W 60/00; H04W 64/00; H04W 76/00; H04W 88/00; H04W 88/12; H04W 88/16; H04W 8/10; H04W 28/24; H04M 15/8038; H04M 15/8044; H04M 2215/34; G06F 9/4451; G06F 9/44505; H04L 65/102
See application file for complete search history.

(56) References Cited

U.S. PATENT DOCUMENTS

| | | | |
|---|---|---|---|
| 9,173,084 B1* | 10/2015 | Foskett | H04W 36/0022 |
| 2001/0049790 A1* | 12/2001 | Farccin et al. | 713/185 |
| 2002/0169883 A1 | 11/2002 | Bright et al. | |
| 2002/0196775 A1* | 12/2002 | Tuohino | H04L 12/2898 |
| | | | 370/352 |
| 2003/0081754 A1* | 5/2003 | Esparza et al. | 379/221.01 |
| 2004/0132449 A1* | 7/2004 | Kowarsch | H04W 4/24 |
| | | | 455/432.1 |
| 2006/0077965 A1* | 4/2006 | Garcia-Martin | H04M 3/42195 |
| | | | 370/352 |
| 2007/0049281 A1* | 3/2007 | Chen | H04W 4/16 |
| | | | 455/445 |
| 2007/0086581 A1* | 4/2007 | Zhu | H04M 7/127 |
| | | | 379/88.17 |
| 2007/0121608 A1* | 5/2007 | Gu | H04L 12/6418 |
| | | | 370/356 |
| 2007/0153766 A1* | 7/2007 | Bienn et al. | |
| 2007/0293216 A1* | 12/2007 | Jiang | 455/433 |
| 2008/0146220 A1* | 6/2008 | Duan | H04W 36/0022 |
| | | | 455/432.1 |
| 2008/0160995 A1* | 7/2008 | Thiebaut et al. | 455/433 |
| 2008/0186921 A1* | 8/2008 | Long | H04W 8/12 |
| | | | 370/331 |
| 2008/0194254 A1* | 8/2008 | Balon | H04W 8/06 |
| | | | 455/433 |
| 2008/0268819 A1* | 10/2008 | Zhu | H04L 12/66 |
| | | | 455/414.1 |
| 2008/0304438 A1* | 12/2008 | Stille | 370/328 |
| 2009/0073938 A1* | 3/2009 | Zhu et al. | 370/311 |
| 2010/0103888 A1* | 4/2010 | Takano | H04M 7/1235 |
| | | | 370/329 |
| 2010/0189072 A1* | 7/2010 | Vikberg | H04W 48/18 |
| | | | 370/331 |
| 2010/0272096 A1* | 10/2010 | Witzel | H04L 65/1016 |
| | | | 370/352 |
| 2010/0290403 A1* | 11/2010 | Lindholm et al. | 370/328 |
| 2010/0330987 A1* | 12/2010 | Lee | H04W 8/26 |
| | | | 455/432.1 |
| 2011/0090845 A1* | 4/2011 | Bishop | H04L 65/1016 |
| | | | 370/328 |
| 2011/0243126 A1 | 10/2011 | Witzel et al. | |
| 2011/0295996 A1* | 12/2011 | Qiu | G06F 9/505 |
| | | | 709/224 |
| 2012/0044861 A1* | 2/2012 | Lu et al. | 370/328 |
| 2012/0099573 A1* | 4/2012 | Jalkanen | 370/338 |
| 2012/0177193 A1 | 7/2012 | Keller et al. | |
| 2013/0171974 A1* | 7/2013 | Bae | H04W 8/12 |
| | | | 455/411 |
| 2013/0194976 A1* | 8/2013 | Choi | H04L 12/66 |
| | | | 370/259 |
| 2013/0343279 A1* | 12/2013 | Keller | H04W 48/18 |
| | | | 370/328 |
| 2014/0342731 A1* | 11/2014 | Carames | H04W 8/02 |
| | | | 455/432.1 |
| 2015/0131526 A1* | 5/2015 | Noldus | H04W 76/02 |
| | | | 370/328 |
| 2016/0135116 A1* | 5/2016 | Chen | H04W 48/14 |
| 2017/0222821 A1* | 8/2017 | Tapia | H04L 12/1425 |
| | | | 370/259 |

FOREIGN PATENT DOCUMENTS

| | | |
|---|---|---|
| CN | 1941933 A | 4/2007 |
| CN | 101018400 A | 8/2007 |
| CN | 101064965 A | 10/2007 |
| CN | 101146367 A | 3/2008 |
| CN | 102420803 A | 4/2012 |
| CN | 102595372 A | 7/2012 |
| CN | 103404221 A | 11/2013 |
| CN | 103747430 A | 4/2014 |
| JP | 2002335583 A | 11/2002 |
| JP | 2009517933 A | 4/2009 |
| JP | 2012075147 A | 4/2012 |
| WO | 2007062674 A1 | 6/2007 |

OTHER PUBLICATIONS

Siemens, "Location of the NeDS Function," 3GPP TSG SA WG2 Architecture—S2#49, S2-052532, Nov. 7-11, 2005, pp. 1-4, Yokosuka, Japan.

NEC Technologies (UK), et al., "Draft Technical Report: Gateway Location Register", 3GPP TSG SA WG2, Tdoc S2-99238, Yokohama, Japan, Apr. 19-21, 1999, 14 pages.

3GPP TR 23.806 V2.0.0 (Nov. 2005), "3rd Generation Partnership Project; Technical Specification Group Services and System Aspects; Voice Call Continuity between CS and IMS Study (Release 7)," Nov. 2005, 153 pages.

* cited by examiner

HOME NETWORK DOMAIN SELECTION FOR ROUTING CALL TO A VISITED NETWORK

CROSS-REFERENCE TO RELATED APPLICATIONS

This application is a continuation of International Application No. PCT/CN2014/094842, filed on Dec. 24, 2014, which claims priority to Chinese Patent Application No. 201310751780.9, filed on Dec. 31, 2013, both of which are hereby incorporated by reference in their entireties.

TECHNICAL FIELD

The present invention relates to the communications field, and specifically, relates to a call control device, a home subscriber server (HSS), an application server (AS), and a user service processing method.

BACKGROUND

The 3rd Generation Partnership Project (3GPP) proposes a next generation network architecture that is based on the Internet Protocol (IP), that is, an IP multimedia subsystem (IMS). Compared with a traditional circuit switched (Circuit Switch, CS) domain, an IMS domain can provide abundant multimedia services for a user.

3GPP further proposes an IMS centralized services (ICS) network architecture. In the ICS network architecture, the traditional CS domain is degraded to an access network of the IMS domain. As a core network, the IMS domain controls all user services, so that consistency and continuity of service experience on a network such as a 2G network, a 3G network, or Long Term Evolution (LTE) can be achieved. Currently, an implementation manner of ICS is upgrading a mobile switching center (MSC) on a live network to a mobile access gateway control function (mAGCF) device, so that an MSC domain supports an ICS function, thereby implementing interworking between the CS domain and the IMS domain.

Upgrading the MSC on the live network is a gradual process. When the MSC is not upgraded, an anchoring manner needs to be used to implement that all supplementary services in the CS domain are controlled by the IMS domain. For example, if user equipment (UE) is located in a CS domain, when the UE initiates a call as calling user equipment or receives a call as called user equipment, the call is routed to an IMS domain on a home network of the UE, and the IMS domain provides a service.

After the UE roams to a visited network, for example, after the UE roams from a home country to a foreign country, if all services are still controlled and provided by the IMS domain on the home network of the UE, the visited network of the UE needs to return, to the IMS domain on the home network in real time, information about a service that needs to be triggered, so that the IMS domain on the home network triggers the corresponding service according to the returned information. However, some differences exist between a CS domain on the visited network and the IMS domain on the home network, for example, timers are inconsistent duration, or signaling mechanisms are different. In this case, when the UE is used as the called UE, many services that need to be triggered cannot be normally triggered. For example, for a late forwarding service, it is possible that a failure cause value cannot be returned to the IMS domain on the home network, and the IMS domain on the home network cannot trigger the late forwarding service according to the failure cause value.

SUMMARY

Embodiments provide a call control device, an HSS, an AS, and a user service processing method, and a visited network does not need to return service information to a home network in real time, so as to ensure that a service of a called UE can be normally triggered.

According to a first aspect, a call control device is provided, where the call control device is located on a home network of called user equipment UE. The call control device includes: a receiving module, configured to: when a call is being initiated to the called UE, receive an access domain confirmation request message sent by a call routing device on the home network, where the access domain confirmation request message carries an identifier of the called UE. The call control device also includes a determining module, configured to determine, according to the identifier of the called UE received by the receiving module, that the home network communicates with a visited network of the called UE by using a circuit switched CS domain on the home network. The call control device also includes a sending module, configured to: after the determining module determines that the home network communicates with the visited network by using the CS domain on the home network, send an access domain confirmation response message to the call routing device, where the access domain confirmation response message carries instruction information, and the instruction information is used to instruct the call routing device to route the call to the visited network by using the CS domain on the home network.

With reference to the first aspect, in a first possible implementation manner, the call control device is a home subscriber server HSS, and the call routing device is a gateway mobile switching center GMSC.

With reference to the first possible implementation manner of the first aspect, in a second possible implementation manner, the sending module is specifically configured to send the access domain confirmation response message to the call routing device, where the access domain confirmation response message carries terminating Customized Applications for Mobile network Enhanced Logic subscription information T_CSI, and the T_CSI is used to instruct the call routing device to acquire, by using the CS domain, a roaming number for routing the call to the visited network.

With reference to the first possible implementation manner or the second possible implementation manner of the first aspect, in a third possible implementation manner, the receiving module is further configured to receive a location update request message sent by a visited mobile switching center VMSC on the visited network, where the location update request message carries the identifier of the called UE; and the sending module is further configured to: if the home network communicates with the visited network by using the CS domain on the home network, send a data insertion request message to the VMSC according to the identifier of the called UE received by the receiving module, where the data insertion request message carries subscriber information stored when the called UE subscribes to a service on the home network, so as to instruct the VMSC to perform registration of the called UE with the visited network according to the subscriber information.

With reference to the third possible implementation manner of the first aspect, in a fourth possible implementation manner, the location update request message includes a number of a visitor location register VLR; and the determining module is specifically configured to: determine a roaming agreement between the visited network and the home network according to the number of the VLR and a correspondence between the number of the VLR and the roaming agreement; and determine, according to the roaming agreement between the visited network and the home network, that the home network communicates with the visited network by using the CS domain on the home network.

With reference to the third possible implementation manner of the first aspect, in a fifth possible implementation manner, the subscriber information includes information about a late forwarding service.

With reference to any manner of the foregoing implementation manners, in a sixth possible implementation manner, the call control device further includes a checking module, where the receiving module is further configured to receive a data update request message sent by an application server AS on the home network, where the data update request message is used to indicate that the called UE requests to set a supplementary service; the checking module is configured to check the supplementary service if the home network communicates with the visited network by using the CS domain on the home network; and the sending module is further configured to send a data update response message to the AS, where the data update response message carries an identifier of successfully setting the supplementary service or an identifier of failing to set the supplementary service.

With reference to the first aspect, in a seventh possible implementation manner, the call control device is an AS, and the call routing device is a call session control function CSCF device.

With reference to the seventh possible implementation manner of the first aspect, in an eighth possible implementation manner, the sending module is specifically configured to send the access domain confirmation response message to the call routing device, where the access domain confirmation response message carries a special number, and the special number is used to instruct the call routing device to route the call to the visited network by using the CS domain on the home network.

With reference to the eighth possible implementation manner or the seventh possible implementation manner of the first aspect, in a ninth possible implementation manner, the sending module is further configured to send an access domain information request message to an HSS, where the access domain information request message carries the identifier of the called UE; and the receiving module is further configured to receive an access domain information response message sent by the HSS, where the access domain information response message carries access domain information, and the access domain information is used to indicate that the home network communicates with the visited network by using the CS domain on the home network.

With reference to the ninth possible implementation manner of the first aspect, in a tenth possible implementation manner, the receiving module is further configured to receive a supplementary service setting request message sent by the called UE, where the supplementary service setting request message is used to indicate that the called UE requests to set a supplementary service; the sending module is further configured to: if the home network communicates with the visited network by using the CS domain on the home network, send a data update request message to the HSS, where the data update request message is used to indicate that the called UE requests to set the supplementary service; the receiving module is further configured to receive a data update response message sent by the HSS, where the data update response message carries an identifier of successfully setting the supplementary service or an identifier of failing to set the supplementary service; and the sending module is further configured to send a supplementary service setting response message to the called UE, where the supplementary service setting response message carries the identifier of successfully setting the supplementary service or the identifier of failing to set the supplementary service.

According to a second aspect, a home subscriber server (HSS) is provided, where the HSS is located on a home network of user equipment UE. The HSS includes: a receiving module, configured to receive a location update request message sent by a visited mobile switching center VMSC on a visited network of the UE, where the location update request message carries an identifier of the UE. The HSS also includes a determining module, configured to determine, according to the identifier of the UE received by the receiving module, whether the home network communicates with the visited network by using a circuit switched CS domain on the home network. The HSS also includes a sending module, further configured to: if the determining module determines that the home network communicates with the visited network by using the CS domain on the home network, send a data insertion request message to the VMSC, where the data insertion request message carries subscriber information stored when the UE subscribes to a service on the home network, so as to instruct the VMSC to perform registration of the UE with the visited network according to the subscriber information.

With reference to the second aspect, in a first possible implementation manner, the location update request message includes a number of a visitor location register VLR; and the determining module is specifically configured to: determine a roaming agreement between the visited network and the home network according to the number of the VLR and a correspondence between the number of the VLR and the roaming agreement, and determine, according to the roaming agreement between the visited network and the home network, that the home network communicates with the visited network by using the CS domain on the home network.

With reference to the second aspect or the first possible implementation manner of the second aspect, in a second possible implementation manner, the subscriber information includes information about a late forwarding service.

With reference to the second possible implementation manner of the second aspect, in a third possible implementation manner, the HSS further includes a checking module, where the receiving module is further configured to receive a data update request message sent by an application server AS on the home network, where the data update request message is used to indicate that the UE requests to set a supplementary service; the checking module is configured to check the supplementary service if the home network communicates with the visited network by using the CS domain on the home network; and the sending module is further configured to send a data update response message to the AS, where the data update response message carries an identifier of successfully setting the supplementary service or an identifier of failing to set the supplementary service.

According to a third aspect, an application server (AS) is provided, where the AS is located on a home network of user equipment UE. The AS includes: a receiving module, configured to receive a supplementary service setting request message sent by the UE, where the supplementary service setting request message is used to indicate that the UE requests to set a supplementary service. The AS also includes a determining module, configured to determine whether the home network communicates with a visited network of the UE by using a circuit switched CS domain on the home network. The AS also includes a sending module, configured to: if it is determined that the home network communicates with the visited network by using the CS domain on the home network, skip checking the supplementary service, and send a data update request message to a home subscriber server HSS on the home network, so that the HSS checks the supplementary service according to the data update request message.

With reference to the third aspect, in a first possible implementation manner, the sending module is further configured to send an access domain information request message to the HSS, where the access domain information request message carries an identifier of the UE; and the receiving module is further configured to receive an access domain information response message sent by the HSS, where the access domain information response message carries access domain information, and the access domain information is used to indicate whether the home network communicates with the visited network by using the CS domain on the home network.

With reference to the third aspect or the first possible implementation manner of the third aspect, in a second possible implementation manner, the receiving module is further configured to: after the sending module sends the data update request message to the HSS, receive a data update response message sent by the HSS, where the data update response message carries an identifier of successfully setting the supplementary service or an identifier of failing to set the supplementary service; and the sending module is further configured to send a supplementary service setting response message to the UE, where the supplementary service setting response message carries the identifier of successfully setting the supplementary service or the identifier of failing to set the supplementary service.

According to a fourth aspect, a user service processing method is provided, and includes: when a call is being initiated to called user equipment UE, receiving, by a call control device on a home network of the called UE, an access domain confirmation request message sent by a call routing device on the home network of the called UE, where the access domain confirmation request message carries an identifier of the called UE. The method also includes determining, by the call control device according to the identifier of the called UE, that the home network communicates with a visited network of the called UE by using a circuit switched CS domain on the home network. The method also includes sending, by the call control device, an access domain confirmation response message to the call routing device, where the access domain confirmation response message carries instruction information, and the instruction information is used to instruct the call routing device to route the call to the visited network by using the CS domain on the home network.

With reference to the fourth aspect, in a first possible implementation manner, the call control device is a home subscriber server HSS, and the call routing device is a gateway mobile switching center GMSC.

With reference to the first possible implementation manner of the fourth aspect, in a second possible implementation manner, the sending, by the call control device, an access domain confirmation response message to the call routing device includes: sending, by the call control device, the access domain confirmation response message to the call routing device, where the access domain confirmation response message carries call terminating Customized Applications for Mobile network Enhanced Logic subscription information T_CSI, and the T_CSI is used to instruct the call routing device to acquire, by using the CS domain, a roaming number for routing the call to the visited network.

With reference to the first possible implementation manner or the second possible implementation manner of the fourth aspect, in a third possible implementation manner, the method further includes: receiving, by the call control device, a location update request message sent by a visited mobile switching center VMSC on the visited network, where the location update request message carries the identifier of the called UE; and if the home network communicates with the visited network by using the CS domain on the home network, sending, by the call control device, a data insertion request message to the VMSC according to the identifier of the called UE, where the data insertion request message carries subscriber information stored when the called UE subscribes to a service on the home network, so as to instruct the VMSC to perform registration of the called UE with the visited network according to the subscriber information.

With reference to the third possible implementation manner of the fourth aspect, in a fourth possible implementation manner, the location update request message includes a number of a visitor location register VLR; and the determining, by the call control device according to the identifier of the called UE, that the home network communicates with a visited network of the called UE by using a circuit switched CS domain on the home network includes: determining, by the call control device, a roaming agreement between the visited network and the home network according to the number of the VLR and a correspondence between the number of the VLR and the roaming agreement; and determining, by the call control device according to the roaming agreement between the visited network and the home network, that the home network communicates with the visited network by using the CS domain on the home network.

With reference to the third possible implementation manner or the fourth possible implementation manner of the fourth aspect, in a fifth possible implementation manner, the subscriber information includes information about a late forwarding service.

With reference to any manner of the foregoing implementation manners, in a sixth possible implementation manner, the method further includes: receiving, by the call control device, a data update request message sent by an application server AS on the home network, where the data update request message is used to indicate that the called UE requests to set a supplementary service; checking, by the call control device, the supplementary service if the home network communicates with the visited network by using the CS domain on the home network; and sending, by the call control device, a data update response message to the AS, where the data update response message carries an identifier of successfully setting the supplementary service or an identifier of failing to set the supplementary service.

With reference to the fourth aspect, in a seventh possible implementation manner, the call control device is an AS, and the call routing device is a call session control function CSCF device.

With reference to the seventh possible implementation manner of the fourth aspect, in an eighth possible implementation manner, the sending, by the call control device, the access domain confirmation response message to the call routing device includes: sending, by the call control device, the access domain confirmation response message to the call routing device, where the access domain confirmation response message carries a special number, and the special number is used to instruct the call routing device to route the call to the visited network by using the CS domain on the home network.

With reference to the seventh possible implementation manner or the eighth possible implementation manner of the fourth aspect, in a ninth possible implementation manner, the determining, by the call control device according to the identifier of the called UE, that the home network communicates with a visited network of the called UE by using a switched circuit CS domain on the home network includes: sending, by the call control device, an access domain information request message to an HSS, where the access domain information request message carries the identifier of the called UE; and receiving, by the call control device, an access domain information response message sent by the HSS, where the access domain information response message carries access domain information, and the access domain information is used to indicate that the home network communicates with the visited network by using the CS domain on the home network.

With reference to the ninth possible implementation manner of the fourth aspect, in a tenth possible implementation manner, the method further includes: receiving, by the call control device, a supplementary service setting request message sent by the called UE, where the supplementary service setting request message is used to indicate that the called UE requests to set a supplementary service; if the home network communicates with the visited network by using the CS domain on the home network, sending, by the call control device, a data update request message to the HSS, where the data update request message is used to indicate that the called UE requests to set the supplementary service; receiving, by the call control device, a data update response message sent by the HSS, where the data update response message carries an identifier of successfully setting the supplementary service or an identifier of failing to set the supplementary service; and sending, by the call control device, a supplementary service setting response message to the called UE, where the supplementary service setting response message carries the identifier of successfully setting the supplementary service or the identifier of failing to set the supplementary service.

According to a fifth aspect, a user service processing method is provided, and includes: receiving, by a home subscriber server HSS on a home network of user equipment UE, a location update request message sent by a visited mobile switching center VMSC on a visited network of the UE, where the location update request message carries an identifier of the UE. The method also includes determining, by the HSS according to the identifier of the UE, whether the home network communicates with the visited network by using a circuit switched CS domain on the home network. The method also includes, if the HSS determines that the home network communicates with the visited network by using the CS domain on the home network, sending, by the HSS, a data insertion request message to the VMSC, where the data insertion request message carries subscriber information stored when the UE subscribes to a service on the home network, so as to instruct the VMSC to perform registration of the UE with the visited network according to the subscriber information.

With reference to the fifth aspect, in a first possible implementation manner, the location update request message includes a number of a visitor location register VLR; and the determining, by the HSS according to the identifier of the UE, whether the home network communicates with the visited network by using a CS domain on the home network includes: determining, by the HSS, a roaming agreement between the visited network and the home network according to the number of the VLR and a correspondence between the number of the VLR and the roaming agreement; and determining, by the HSS according to the roaming agreement between the visited network and the home network, that the home network communicates with the visited network by using the CS domain on the home network.

With reference to the fifth aspect or the first possible implementation manner of the fifth aspect, in a second possible implementation manner, the subscriber information includes a late forwarding service.

With reference to the fifth aspect or either of the foregoing implementation manners, in a third possible implementation manner, the method further includes: receiving, by the HSS, a data update request message sent by an application server AS on the home network, where the data update request message is used to indicate that the UE requests to set a supplementary service; checking, by the HSS, the supplementary service if the HSS determines that the home network communicates with the visited network by using the CS domain on the home network; and sending, by the HSS, a data update response message to the AS, where the data update response message carries an identifier of successfully setting the supplementary service or an identifier of failing to set the supplementary service.

According to a sixth aspect, a user service processing method is provided, and includes: receiving, by an application server AS on a home network of user equipment UE, a supplementary service setting request message sent by the UE, where the supplementary service setting request message is used to indicate that the UE requests to set a supplementary service. The method also includes determining, by the AS, whether the home network communicates with a visited network of the UE by using a circuit switched CS domain on the home network. The method also includes, if the AS determines that the home network communicates with the visited network by using the CS domain on the home network, skipping checking, by the AS, the supplementary service, and sending a data update request message to a home subscriber server HSS on the home network, so that the HSS checks the supplementary service according to the data update request message.

With reference to the sixth aspect, in a first possible implementation manner, the determining, by the AS, whether the home network communicates with a visited network of the UE by using a circuit switched CS domain on the home network includes: sending, by the AS, an access domain information request message to the HSS, where the access domain information request message carries an identifier of the UE; and receiving, by the AS, an access domain information response message sent by the HSS, where the access domain information response message carries access domain information, and the access domain information is used to indicate whether the home network communicates with the visited network by using the circuit switched CS domain on the home network.

With reference to the sixth aspect or the first possible implementation manner of the sixth aspect, in a second possible implementation manner, after the data update request message is sent to the HSS, the method further includes: receiving, by the AS, a data update response message sent by the HSS, where the data update response message carries an identifier of successfully setting the supplementary service or an identifier of failing to set the supplementary service; and sending, by the AS, a supplementary service setting response message to the UE, where the supplementary service setting response message carries the identifier of successfully setting the supplementary service or the identifier of failing to set the supplementary service.

In the embodiments, a call control device receives, from a call routing device, an access domain confirmation request message that carries an identifier of a called UE, and determines, according to the identifier of the called UE, that a home network of the called UE communicates with a visited network of the called UE by using a CS domain on the home network. Therefore, the call control device sends an access domain confirmation response message that carries instruction information to the call routing device to instruct the call routing device to route a call to the visited network by using the CS domain on the home network, so that service triggering can be controlled by the CS domain instead of being controlled by an IMS domain. Therefore, the visited network does not need to return service information to the home network in real time, so as to ensure that a service of the called UE can be normally triggered.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The technical solutions of the embodiments may be applied to various communications networks, such as: a Global System for Mobile Communications (GSM) network, a Code Division Multiple Access (CDMA) network, a Wideband Code Division Multiple Access (WCDMA) network, a general packet radio service (GPRS) network, a Long Term Evolution (LTE) network, and a Universal Mobile Telecommunications System (UMTS) network.

In the embodiments, a UE may access an IMS domain by using a CS domain, and the user equipment may be a mobile terminal (MT) such as a mobile phone (or referred to as a "cellular" phone), or a computer that has a mobile terminal. As an example instead of a limitation, the UE may be a portable, pocket-sized, handheld, computer built-in, or vehicle-mounted mobile apparatus. The UE may exchange voice or data with a radio access network, or may exchange voice and data with a radio access network.

Figure 1:
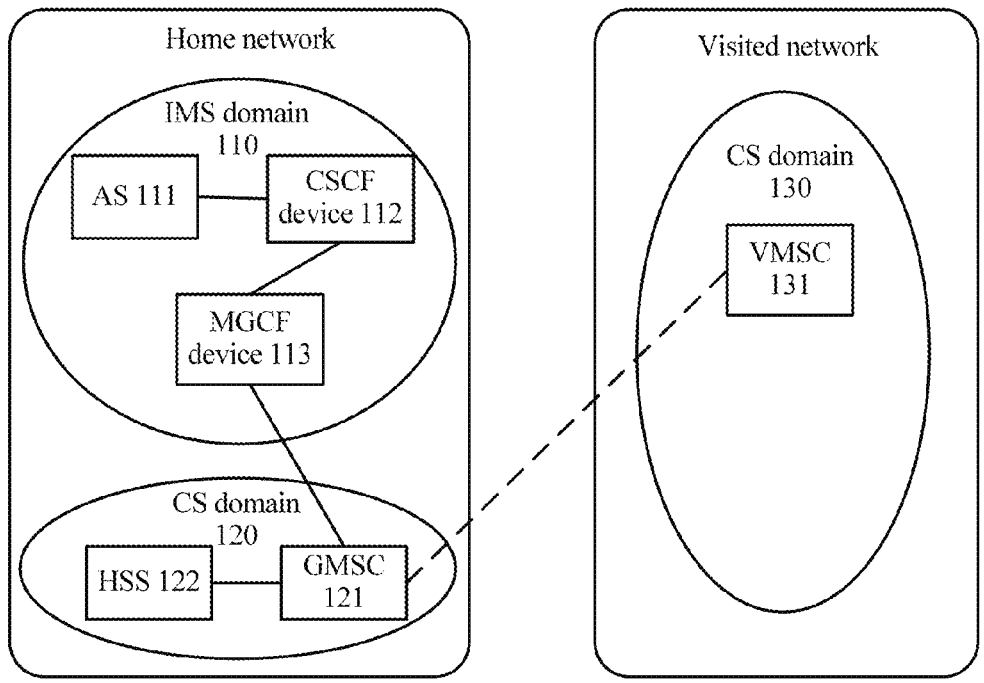
FIG. 1 is a schematic diagram of an application scenario according to an embodiment.

FIG. 1 is a schematic diagram of an application scenario according to an embodiment.

As shown in FIG. 1, a home network of a UE includes an IMS domain no and a CS domain 120. The CS domain 120 may be used as an access domain of the IMS domain 110, and all services of the UE may be controlled by the IMS domain 110. The CS domain 120 may include a gateway mobile switching center (GMSC) 121 and an HSS 122, the GMSC 121 may route a call of the UE, and the HSS 122 may store subscription information of the UE on the home network. The IMS domain no may include an AS 111, a call session control function (CSCF) device 112, and a media gateway control function (MGCF) device 113. The AS 111 is a network element that controls and provides a service in the IMS domain no. The CSCF device 112 may control a call session. The CS domain 120 and the IMS domain no may interwork with each other by using the MGCF device 113.

After the UE roams to a visited network, the visited network may include an IMS domain, or may include an IMS domain and a CS domain, or may include a CS domain. In FIG. 1, an example in which the visited network includes only a CS domain 130 is used for description. As shown in FIG. 1, the CS domain 130 on the visited network includes a visited mobile switching center (VMSC) 131. The VMSC 131 may route a call.

In the scenario shown in FIG. 1, the visited network includes only the CS domain 130. Therefore, the home network may communicate with the visited network by using the CS domain 120 on the home network, that is, CS domain roaming is enabled between the home network and the visited network. In this case, if the IMS domain no on the home network still controls a service of the UE, the visited network of the UE needs to return, to the IMS domain 110 on the home network in real time, information about a service that needs to be triggered, so that the IMS domain no on the home network triggers the corresponding service according to the returned information. However, some differences exist between the CS domain 130 of the visited network and the IMS domain 100 on the home network, for example, timers are inconsistent duration, or signaling mechanisms are different. In this case, when the UE is used as a called UE, many services that need to be triggered cannot be normally triggered.

Therefore, in this embodiment, when another UE initiates a call to the UE, the home network may route the call to the visited network by using the CS domain 120 on the home network. The following describes the process in detail.

Figure 2:
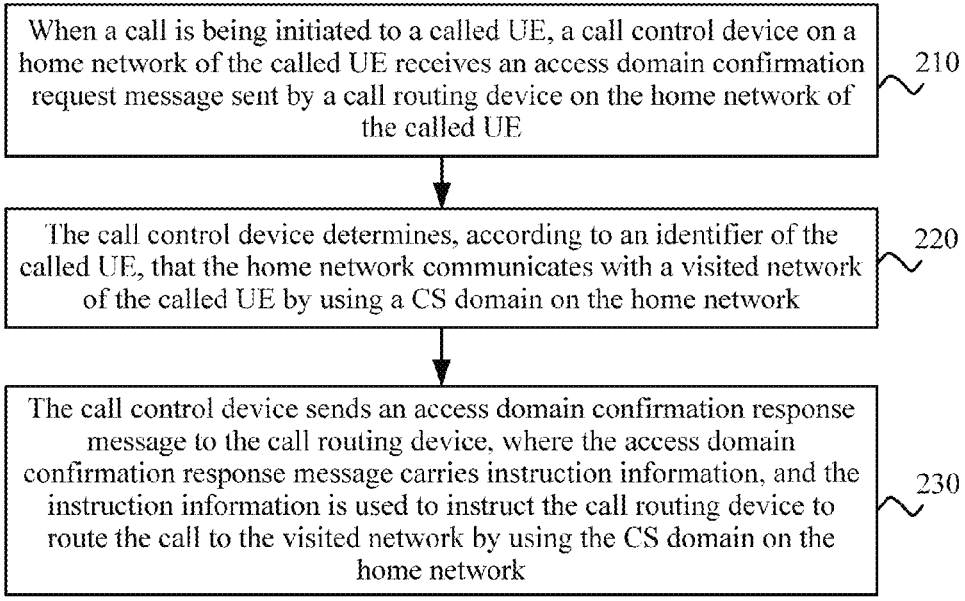
FIG. 2 is a schematic block diagram of a user service processing method according to an embodiment.

FIG. 2 is a schematic block diagram of a user service processing method according to an embodiment. The method in FIG. 2 is executed by a call control device.

210. When a call is being initiated to a called UE, a call control device on a home network of the called UE receives an access domain confirmation request message sent by a call routing device on the home network of the called UE, where the access domain confirmation request message carries an identifier of the called UE.

220. The call control device determines, according to the identifier of the called UE, that the home network communicates with a visited network of the called UE by using a CS domain on the home network.

230. The call control device sends an access domain confirmation response message to the call routing device, where the access domain confirmation response message carries instruction information, and the instruction information is used to instruct the call routing device to route the call to the visited network by using the CS domain on the home network.

In a current solution for anchoring a called party, if a calling UE initiates a call to a called UE, the call needs to be anchored back to an IMS domain on a home network of the called UE, and the call is connected to the called UE by using the IMS domain. That is, all services of the called UE are controlled and provided by the IMS domain. However, when the called UE roams, for example, after the called UE roams from a home country to a foreign country, the called UE is located on a visited network, and a difference between the visited network and the home network may cause that the IMS domain on the home network cannot normally trigger some services, such as a service that can be triggered only when a failure cause value needs to be returned to the IMS domain. For example, for a late forwarding service, the IMS domain can trigger the late forwarding service for the called UE only when a failure cause value needs to be returned to the IMS domain on the home network of the called UE. However, because of a problem such as a timer duration difference or a signaling mechanism difference between the visited network and the home network, it is pretty difficult for the visited network to return the failure cause value to the IMS domain on the home network. Therefore, the late forwarding service cannot be normally triggered. The late forwarding service refers to a forwarding service triggered after a call is routed to the visited network, such as a forwarding service triggered when there is no answer from the called UE or a forwarding service triggered when the called UE is busy.

In this embodiment, a calling UE initiates the call to the called UE. When the calling UE initiates the call to the called UE, the call control device may determine whether the home network of the called UE communicates with the visited network of the called UE by using the CS domain on the home network. That the home network communicates with the visited network by using the CS domain on the home network indicates that CS domain roaming is enabled between the home network and the visited network, that is, a CS domain roaming agreement is signed between the home network and the visited network. If it is determined that the home network communicates with the visited network by using the CS domain on the home network, the call control device instructs the call routing device to route the call, which is initiated by the calling UE, to the visited network by using the CS domain on the home network, so that the visited network routes the call to the called UE. In other words, if the home network of the called UE communicates with the visited network by using the CS domain on the home network, the call may be routed to the called UE by using the CS domain on the home network instead of being routed to the called UE by using an IMS domain on the home network. After the call is routed to the called UE by using the CS domain on the home network, a CS domain on the visited network may trigger and provide a service of the called UE. In this case, the visited network does not need to return service information to the home network in real time, and therefore it is ensured that a service of the called UE can be normally triggered. For example, for a late forwarding service, the visited network may directly perform triggering according to a failure cause value without a need to return the failure cause value to the home network, and therefore it is ensured that the late forwarding service can be normally triggered.

In this embodiment, a call control device receives, from a call routing device, an access domain confirmation request message that carries an identifier of a called UE, and determines, according to the identifier of the called UE, that a home network of the called UE communicates with a visited network of the called UE by using a CS domain on the home network. Therefore, the call control device sends an access domain confirmation response message that carries instruction information to the call routing device to instruct the call routing device to route a call to the visited network by using the CS domain on the home network, so that service triggering can be controlled by the CS domain instead of being controlled by an IMS domain. Therefore, the visited network does not need to return service information to the home network in real time, and it is ensured that a service of the called UE can be normally triggered.

It may also be learned from the foregoing that an IMS domain is currently at an initial development stage, and is not widely deployed. In this case, an IMS domain may not be deployed on a visited network, and a home network can communicate with the visited network only by using a CS domain on the home network, but cannot communicate with the visited network by using an IMS domain on the home network. For this scenario, this embodiment of the present invention is more applicable. In this scenario, if a CS domain on the visited network is required to return service information to the IMS domain on the home network in real time, because there are problems such as timer synchronization and signaling format conversion between the two networks, it is difficult for the CS domain on the visited network to return the service information to the IMS domain on the home network in real time. However, according to this embodiment of the present invention, service triggering can be controlled by the CS domain instead of being controlled by the IMS domain. Therefore, the visited network does not need to return the service information to the home network in real time, and it is ensured that a service of the called UE can be normally triggered.

In this embodiment, the calling UE that initiates the call to the called UE may be located in a CS domain, or may be located in an IMS domain. When the calling UE is located in the CS domain, the call control device may be an HSS on the home network of the called UE. When the calling UE is located in the IMS domain, the call control device may be an AS on the home network of the called UE.

Optionally, in an embodiment, the foregoing call control device may be an HSS. The foregoing call routing device may be a GMSC.

In this embodiment, the HSS may be a device that integrates functions of an HSS in the IMS domain, an HSS on a system architecture evolution (SAE) network, and a home location register (HLR). Therefore, the HSS in this embodiment may be referred to as a converged HSS.

Optionally, in another embodiment, in step 210, the HSS may receive the access domain confirmation request message sent by the GMSC. In step 230, the HSS may send the access domain confirmation response message to the GMSC, where the access domain confirmation response message may include teminating Customized Applications for Mobile network Enhanced Logic subscription information (Terminating CAMEL (Customized Applications for Mobile network Enhanced Logic) Subscription Information, T_CSI). The T_CSI may be used to instruct to acquire, by using the CS domain, a roaming number for roaming the call to the visited network.

In this embodiment, the instruction information in step 230 may be the T_CSI. Specifically, after the GMSC receives an incoming initial address message (IAM), the GMSC may send the access domain confirmation request message to the HSS according to the IAM. The IAM may be used to indicate that the calling UE initiates the call to the called UE. The IAM is a first message for establishing the call between the calling UE and the called UE, and may include related information of call routing determining. The access domain confirmation request message sent by the GMSC to the HSS may be a send routing information (SRI) request message. The access domain confirmation response message returned by the HSS to the GMSC may be an SRI_ACK message, and the SRI_ACK message may include the T_CSI of the called UE. In this embodiment, herein, the SRI request message is referred to as a first SRI request message, and herein, the SRI_ACK message is referred to as a first SRI_ACK message. The called UE is located on the visited network, and the home network communicates with the visited network by using the CS domain on the home network. Therefore, the T_CSI may be used to instruct to acquire the roaming number by using the CS domain, where the roaming number is used to route the call to the visited network. It may be learned that herein, the T_CSI does not point to an AS in the IMS domain on the home network of the called UE, and in this case, the GMSC does not route the call to the IMS domain. Specifically, the GMSC may trigger a send routing information procedure according to the T_CSI. The procedure may be: The GMSC may send a second SRI request message to the HSS, where the second SRI request message is used to request the roaming number. The HSS may send a Provide Roaming Number (PRN) message to a VMSC according to the second SRI request message. The VMSC may send a PRN response (PRN_ACK) message to the HSS according to the PRN message, where the PRN_ACK message may carry the roaming number. The HSS may send a second SRI_ACK message to the GMSC, where the second SRI_ACK message may carry the roaming number. In this case, the GMSC may route the call to the VMSC according to the roaming number, and the VMSC routes the call to the called UE.

After the called UE roams to the visited network, to ensure normal communication of the called UE, the called UE needs to be first registered with the visited network, that is, a location update needs to be performed. Optionally, in another embodiment, before step 210, the HSS may receive a location update request message sent by the VMSC on the visited network, where the location update request message carries the identifier of the called UE. If the home network communicates with the visited network by using the CS domain on the home network, the HSS may send a data insertion request message to the VMSC according to the identifier of the called UE, where the data insertion request message carries subscriber information stored when the called UE subscribes to a service on the home network, so as to instruct the VMSC to perform registration of the called UE with the visited network according to the subscriber information.

Specifically, the foregoing subscriber information may include information about the service to which the called UE subscribes on the home network. The subscriber information may further include information such as the identifier of the called UE. When the called UE initiates a location update request, because the called UE is located on the visited network, and the home network communicates with the visited network by using the CS domain on the home network, the HSS may send, to the VMSC, the information about the service to which the called UE subscribes on the home network, and the VMSC controls triggering of a service of the called UE. In this case, it is ensured that the service of the called UE can be normally triggered.

Optionally, in another embodiment, the foregoing subscriber information may include information about a late forwarding service. In this case, a late forwarding service of the called UE may be triggered by the VMSC. In addition, the subscriber information sent by the HSS to the VMSC may be other information about a service similar to the late forwarding service, such as information about a service that needs to be triggered according to a failure cause value.

Optionally, in another embodiment, the location update request message may include a number of a visitor location register (VLR). The HSS may determine a roaming agreement between the visited network and the home network according to the number of the VLR and a correspondence between the number of the VLR and the roaming agreement. The HSS may determine, according to the roaming agreement between the visited network and the home network, that the home network communicates with the visited network by using the CS domain on the home network.

Specifically, the number of the VLR may identify the VLR. The VLR may be disposed at the VMSC, and generally, the number of the VLR is the same as a number of the VMSC. The correspondence between the number of the VLR and the roaming agreement may be stored on the HSS in advance. In this case, after the number of the VLR is acquired, the roaming agreement between the visited network and the home network may be determined. The roaming agreement may refer to a manner of roaming enabled between the visited network and the home network. The manner of roaming may mean that the home network communicates with the visited network by using the CS domain or the IMS domain on the home network. In this case, the HSS may determine, according to the roaming agreement between the visited network and the home network, that the home network communicates with the visited network by using the CS domain on the home network.

In addition, the HSS may store the number of the VLR. In step 220, the HSS may acquire the number of the VLR according to the identifier of the called UE, and may determine the roaming agreement between the visited network and the home network according to the correspondence between the roaming agreement and the number that is of the VLR and stored on the HSS. The HSS may determine, according to the roaming agreement between the visited network and the home network, that the home network communicates with the visited network by using the CS domain on the home network.

In addition, when the AS requests the HSS for access domain information, the HSS may determine the access domain information according to the stored number of the VLR, where the access domain information may be used to indicate that the home network communicates with the visited network by using the CS domain on the home network. Then, the HSS may send the access domain information to the AS.

Optionally, in another embodiment, the HSS may further receive an access domain information request message from the AS on the home network, where the access domain information request message is used to request access domain information. The HSS may send an access domain information response message to the AS according to the access domain information request message, where the access domain information response message may carry the access domain information, and the access domain information may be used to indicate that the home network communicates with the visited network by using the CS domain on the home network.

Optionally, in another embodiment, the HSS may further receive a data update request message sent by the AS on the home network, where the data update request message is used to indicate that the called UE requests to set a supplementary service. The HSS may check the supplementary service if the home network communicates with the visited network by using the CS domain on the home network. The HSS may send a data update response message to the AS, where the data update response message carries an identifier of successfully setting the supplementary service or an identifier of failing to set the supplementary service.

To provide more abundant services for a user and enhance user experience, a live network can support that the user sets some supplementary services on a UE according to an actual requirement. Currently, in a CS domain, a supplementary service may be set on the UE in an unstructured supplementary service data (USSD) manner. In an IMS domain, a supplementary service may be set on the UE by using a Ut interface. When the UE is located on a visited network, and a home network of the UE communicates with the visited network by using a CS domain on the home network, a supplementary service may be set on the UE in a USSD manner, or a supplementary service may be set on the UE by using a Ut interface. A check criterion of a supplementary service in the CS domain is different from a check criterion of a supplementary service in the IMS domain. Therefore, a service may be checked by using two different check criteria, which causes inconsistent service setting.

Therefore, after receiving a supplementary service setting request message sent by the called UE by using a Ut interface, the AS does not check a supplementary service, and sends a data update request message to the HSS, and the HSS checks the supplementary service according to the data update request message, so that service inconsistency caused by different check criteria of the supplementary service can be avoided.

The foregoing describes a process of executing the method in FIG. 2 by the HSS when the calling UE is located in the CS domain. The following describes a specific process when the calling UE is located in the IMS domain.

Optionally, in another embodiment, the foregoing call control device may be an AS, and the call routing device may be a call session control function (CSCF) device.

When the calling UE is located in the IMS domain, the calling UE initiates the call to the called UE from the IMS domain. In this case, a corresponding device in an IMS domain on the home network of the called UE needs to perform processing. The AS is a network element that controls and provides a service in the IMS domain.

Optionally, in another embodiment, in step 210, the AS may receive the access domain confirmation request message sent by the CSCF device. In step 230, the AS may send the access domain confirmation response message to the CSCF device, where the response message may include a special number, and the special number is used to instruct the CSCF device to route the call to the visited network by using the CS domain on the home network.

In this embodiment, the instruction information in step 230 may be the special number. Specifically, after receiving a session request message initiated by the calling UE in the IMS domain, the CSCF device may send the access domain confirmation request message to the AS according to the session request message, where the access domain confirmation request message may carry the identifier of the called UE, such as a called number. The called UE is located on the visited network, and the home network communicates with the visited network by using the CS domain on the home network. Therefore, the AS may not perform service triggering, and returns the access domain confirmation response message that includes the special number to the CSCF device, so that the CS domain controls service triggering. The special number may be a number prefix added before the called number, and the CSCF device may route the call to a media gateway control function (MGCF) device according to the special number. The MGCF device is a network element that implements interworking between the IMS domain and the CS domain. The MGCF device may then route the call to a GMSC, and the GMSC then triggers a send routing information procedure. For the procedure, refer to the send routing information procedure triggered by the GMSC described above, and details are not described again. By performing the send routing information procedure, the GMSC may acquire a roaming number, and then may route the call to a VMSC according to the roaming number, so that the VMSC routes the call to the called UE.

Optionally, in another embodiment, in step 220, the AS may send an access domain information request message to an HSS, where the access domain information request message is used to request access domain information. The AS may receive an access domain response message from the HSS, where the access domain information response message carries the access domain information, and the access domain information is used to indicate that the home network communicates with the visited network by using the CS domain on the home network.

To provide more abundant services for a user and enhance user experience, a live network can support that the user sets some supplementary services on a UE according to an actual requirement. Currently, in a CS domain, a supplementary service may be set on the UE in a USSD manner. In an IMS domain, a supplementary service may be set on the UE by using a Ut interface. When the UE is located on a visited network, and a home network of the UE communicates with the visited network by using a CS domain on the home network, a supplementary service may be set on the UE in a USSD manner, or a supplementary service may be set on the UE by using a Ut interface. A check criterion of a supplementary service in the CS domain is different from a check criterion of a supplementary service in the IMS domain. Therefore, a service may be checked by using two different check criteria, which causes inconsistent service setting.

Optionally, in another embodiment, the AS may receive a supplementary service setting request message sent by the called UE, where the supplementary service setting request message is used to indicate that the called UE requests to set a supplementary service. If the home network communicates with the visited network by using the CS domain on the home network, the AS may send a data update request message to the HSS, where the data update request message is used to indicate that the called UE requests to set the supplementary service. The AS may receive a data update response message sent by the HSS, where the data update response message carries an identifier of successfully setting the supplementary service or an identifier of failing to set the supplementary service. The AS may send a supplementary service setting response message to the called UE, where the supplementary service setting response message carries the identifier of successfully setting the supplementary service or the identifier of failing to set the supplementary service.

Specifically, the called UE is located on the visited network, and the home network communicates with the visited network by using the CS domain on the home network. Therefore, after receiving the supplementary service setting request message sent by the called UE by using a Ut interface, the AS may not check the supplementary service, and sends the data update request message to the HSS. In this case, the HSS checks the supplementary service according to the data update request message. The data update request message may carry information about the supplementary service set on the called UE.

After the HSS checks the supplementary service, if the supplementary service is valid, the HSS may store the information about the supplementary service, and may send the data update response message to the AS, where the data update response message may carry the identifier of successfully setting the supplementary service. The identifier of successfully setting the supplementary service may indicate that the supplementary service is successfully set. If the supplementary service is unvalid, the HSS does not store the related information about the supplementary service, and then sends the data update response message to the AS, where the data update response message may carry the identifier of failing to set the supplementary service. The identifier of failing to set the supplementary service may indicate that the supplementary service fails to be set. The AS may send the supplementary service setting response message to the UE according to the data update response message of the HSS. If the data update response message carries the identifier of successfully setting the supplementary service, the supplementary service setting response message also carries the identifier of successfully setting the supplementary service; if the data update response message carries the identifier of failing to set the supplementary service, the supplementary service setting response message also carries the identifier of failing to set the supplementary service. In this embodiment, the AS does not perform a service check on the supplementary service that the called UE requests to set, but the HSS performs the check, which can avoid that the supplementary service is checked by using two check criteria, so that supplementary service inconsistency can be avoided.

The foregoing describes a processing process of a call service of the called UE. The following describes a location update process of the UE.

In an existing solution, when the UE initiates a location update on the visited network, if all services are controlled and provided by the IMS domain on the home network of the UE, the IMS domain does not need to send, to the visited network, information about a service to which the UE subscribes on the home network, such as a late forwarding service. However, as described above, because the UE roams to the visited network, if all services are still controlled and provided by the IMS domain on the home network of the UE, a service of the UE cannot be normally triggered.

Figure 3A:
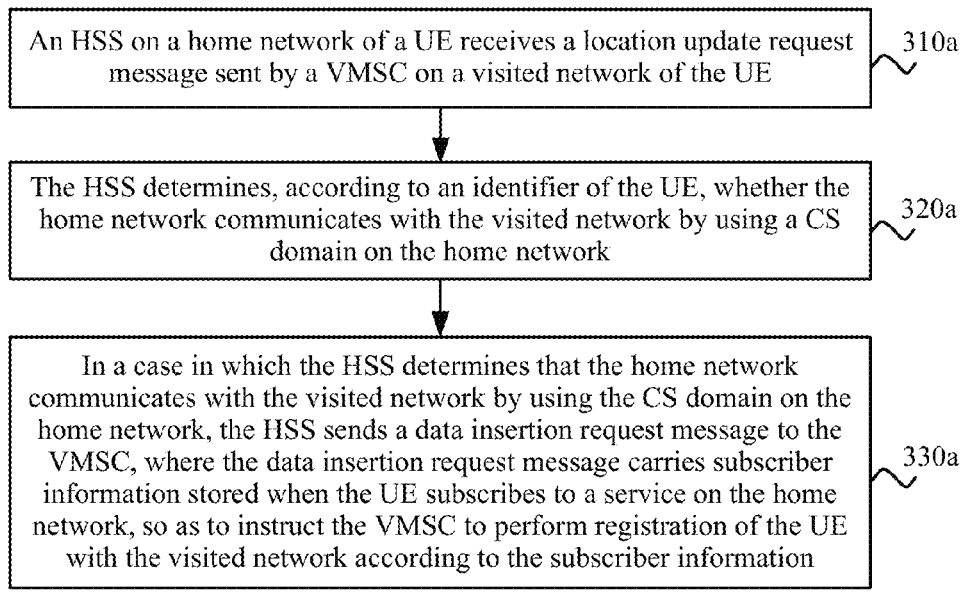
FIG. 3a is a schematic flowchart of a user service processing method according to another embodiment.

FIG. 3a is a schematic flowchart of a user service processing method according to another embodiment.

310a. An HSS on a home network of a UE receives a location update request message sent by a VMSC on a visited network of the UE, where the location update request message carries an identifier of the UE.

320a. The HSS determines, according to the identifier of the UE, whether the home network communicates with the visited network by using a CS domain on the home network.

330a. If the HSS determines that the home network communicates with the visited network by using the CS domain on the home network, the HSS sends a data insertion request message to the VMSC, where the data insertion request message carries subscriber information stored when the UE subscribes to a service on the home network, so as to instruct the VMSC to perform registration of the UE with the visited network according to the subscriber information.

The subscriber information may include information about the service to which the UE subscribes on the home network.

In this embodiment, in the case in which it is determined that the home network communicates with the visited network by using the CS domain on the home network, the data insertion request message is sent to the VMSC, where the data insertion request message carries subscriber information stored when the UE subscribes to a service on the home network, so that the VMSC can control triggering of the service of the UE according to the subscriber information, and it is ensured that the service of the UE can be normally triggered.

Optionally, in an embodiment, the location update request message may include a number of a VLR. In step 320a, the HSS may determine a roaming agreement between the visited network and the home network according to the number of the VLR and a correspondence between the number of the VLR and the roaming agreement. The HSS may determine, according to the roaming agreement between the visited network and the home network, that the home network communicates with the visited network by using the CS domain on the home network.

Optionally, in another embodiment, the foregoing subscriber information may include information about a late forwarding service.

The HSS may send the information about the late forwarding service to the VMSC. In this case, when the UE is used as a called UE, the late forwarding service may be triggered by the VMSC according to the information about the late forwarding service. In this case, the visited network does not need to return a failure cause value to the home network, so as to ensure that the late forwarding service can be normally triggered.

Optionally, in another embodiment, the HSS may further receive an access domain information request message from an AS on the home network, where the access domain information request message is used to request access domain information. The HSS may send an access domain information response message to the AS, where the access domain information response message may carry the access domain information, and the access domain information may be used to indicate whether the home network communicates with the visited network by using the CS domain on the home network. The AS needs to determine, according to the access domain information, whether to control a service of the UE. Therefore, the AS may acquire the access domain information from the HSS.

Optionally, in another embodiment, the HSS may further receive a data update request message sent by the AS on the home network, where the data update request message is used to indicate that the UE requests to set a supplementary service. The HSS may check the supplementary service if the HSS determines that the home network communicates with the visited network by using the CS domain on the home network. The HSS may send a data update response message to the AS, where the data update response message carries an identifier of successfully setting the supplementary service or an identifier of failing to set the supplementary service. It should be understood that if the data update response message carries the identifier of successfully setting the supplementary service, the supplementary service setting response message also carries the identifier of successfully setting the supplementary service; if the data update response message carries the identifier of failing to set the supplementary service, the supplementary service setting response message also carries the identifier of failing to set the supplementary service. In this embodiment, the AS does not perform a service check on the supplementary service that the UE requests to set, but the HSS performs the check, which can avoid that the supplementary service is checked by using two check criteria, so that supplementary service inconsistency can be avoided.

Currently, in a CS domain, a supplementary service may be set on a UE in a USSD manner. In an IMS domain, a supplementary service may be set on the UE by using a Ut interface. When the UE is located on a visited network, and a home network of the UE communicates with the visited network by using a CS domain on the home network, a supplementary service may be set on the UE in a USSD manner, or a supplementary service may be set on the UE by using a Ut interface. A check criterion of a supplementary service in the CS domain is different from a check criterion of a supplementary service in the IMS domain. Therefore, a service may be checked by using two different check criteria, which causes inconsistent service setting. The following describes a process of setting the supplementary service on the UE in this embodiment.

Figure 3B:
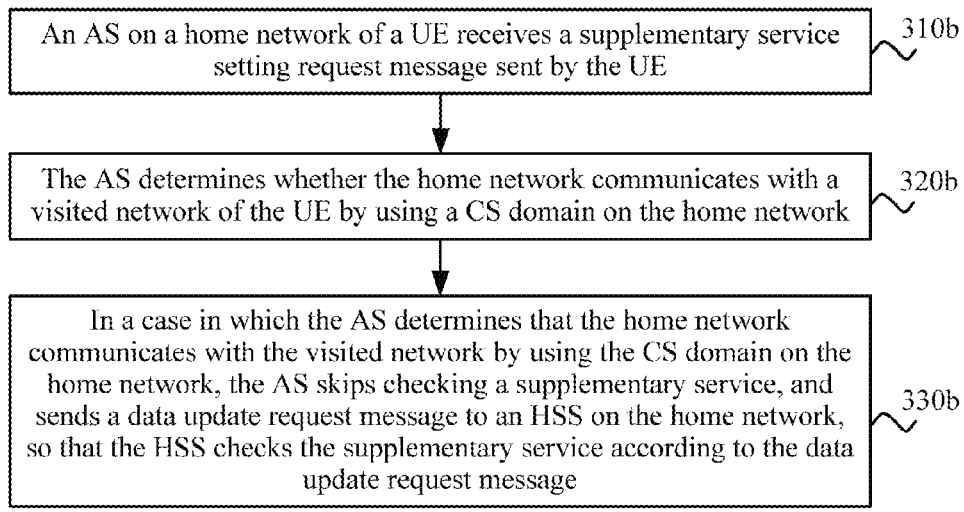
FIG. 3b is a schematic flowchart of a user service processing method according to another embodiment.

FIG. 3b is a schematic flowchart of a user service processing method according to another embodiment.

310b. An AS on a home network of a UE receives a supplementary service setting request message sent by the UE, where the supplementary service setting request message is used to indicate that the UE requests to set a supplementary service.

320b. The AS determines whether the home network communicates with a visited network of the UE by using a CS domain on the home network.

330b. If the AS determines that the home network communicates with the visited network by using the CS domain on the home network, the AS does not check the supplementary service, and sends a data update request message to an HSS on the home network, so that the HSS checks the supplementary service according to the data update request message.

In this embodiment, in the case in which the AS determines that the home network communicates with the visited network by using the CS domain on the home network, the AS does not check the supplementary service, and sends the data update request message to the HSS on the home network, so that the HSS checks the supplementary service, which can avoid that the supplementary service is checked by using two check criteria, so that supplementary service inconsistency can be avoided.

Optionally, in an embodiment, in step 320b, the AS may send an access domain information request message to the HSS, where the access domain information request message carries an identifier of the UE. The AS may receive an access domain information response message sent by the HSS, where the access domain information response message carries access domain information, and the access domain information is used to indicate whether the home network communicates with the visited network by using the CS domain on the home network.

It may be learned from the foregoing that the HSS is responsible for a location update of the UE. When the UE initiates a location update request to a VMSC, the HSS may acquire a number of a VLR from the VMSC, so as to determine the access domain information according to the number of the VLR. The AS may acquire the access domain information from the HSS.

Optionally, in another embodiment, after step 33ob, the AS may receive a data update response message sent by the HSS, where the data update response message carries an identifier of successfully setting the supplementary service or an identifier of failing to set the supplementary service. The AS may further send a supplementary service setting response message to the UE, where the supplementary service setting response message carries the identifier of successfully setting the supplementary service or the identifier of failing to set the supplementary service. It should be understood that if the data update response message carries the identifier of successfully setting the supplementary service, the supplementary service setting response message also carries the identifier of successfully setting the supplementary service; if the data update response message carries the identifier of failing to set the supplementary service, the supplementary service setting response message also carries the identifier of failing to set the supplementary service.

The following describes embodiments in detail with reference to specific examples. It should be understood that the following examples are merely intended to help a person skilled in the art better understand the embodiments of the present invention, instead of limiting the scope of the embodiments of the present invention.

Figure 4:
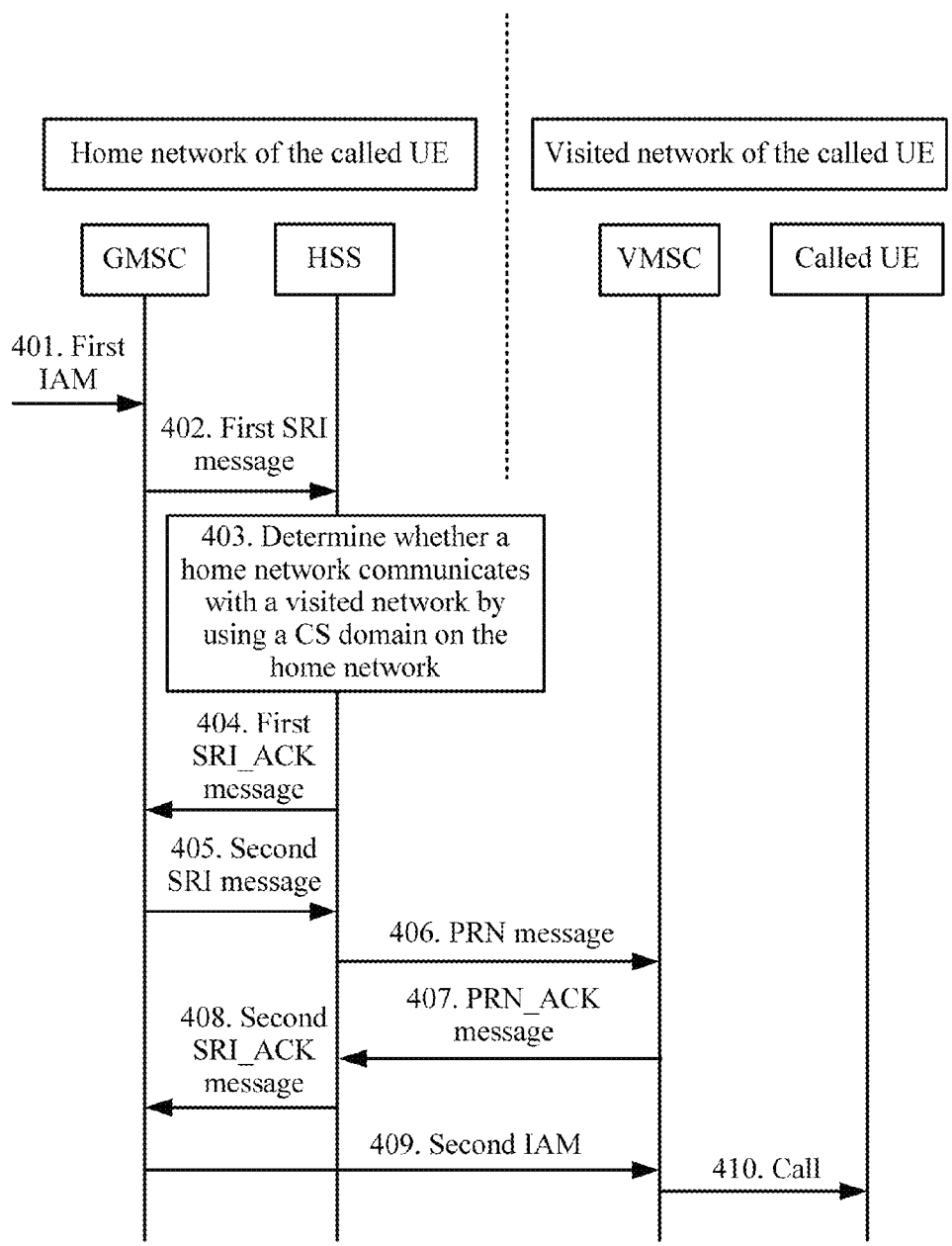
FIG. 4 is a schematic flowchart of a process of a user service processing method according to an embodiment.

FIG. 4 is a schematic flowchart of a process of a user service processing method according to an embodiment. In FIG. 4, it is assumed that a calling UE that initiates a call to a called UE is located in a CS domain.

401. A GMSC receives an incoming first IAM, where the first IAM may be used to indicate that the calling UE initiates the call to the called UE.

402. The GMSC sends a first SRI message to an HSS according to the IAM, where the first SRI message may be used to indicate that the calling UE initiates the call to the called UE, and the first SRI message may carry an identifier of the called UE.

403. The HSS determines, according to the first SRI message, whether a home network of the called UE communicates with a visited network by using a CS domain on the home network.

For example, in a process of initiating a location update by the called UE, the HSS may acquire a number of a VLR, and store the number of the VLR. In step 403, the HSS may acquire the stored number of the VLR according to the identifier of the called UE. A roaming agreement between the visited network and the home network is determined according to the number of the VLR and a correspondence between the number of the VLR and the roaming agreement. Then, the HSS may determine, according to the roaming agreement between the visited network and the home network, whether the home network of the called UE communicates with the visited network by using the CS domain on the home network.

404. If the home network communicates with the visited network by using the CS domain on the home network, the HSS sends a first SRI_ACK message to the GMSC, where the first SRI_ACK message includes T_CSI of the called UE.

In FIG. 4, it is assumed that the home network of the called UE communicates with the visited network by using the CS domain on the home network, but cannot communicate with the visited network by using an IMS domain on the home network. The T_CSI is used to instruct the GMSC to acquire, by using the CS domain on the home network, a roaming number for roaming the call to the visited network.

It should be understood that if the home network may communicate with the visited network by using the IMS domain on the home network, the HSS may send anchoring T_CSI to the GMSC, where the anchoring T_CSI is used to instruct the GMSC to route the call to an AS on the home network. For a specific process, refer to an existing process, and details are not described again.

405. The GMSC sends a second SRI message to the HSS according to the T_CSI, where the second SRI message is used to request a roaming number.

406. The HSS sends a PRN message to a VMSC, where the PRN message is used to request the roaming number.

407. The VMSC sends a PRN_ACK message to the HSS, where the PRN_ACK message carries the roaming number.

408. The HSS sends a second SRI_ACK message to the GMSC, where the second SRI_ACK message includes the roaming number, and the roaming number is used to route the call to the visited network.

409. The GMSC sends a second TAM to the VMSC according to the roaming number, where the second TAM is used to route the call to the VMSC.

410. The VMSC routes the call to the called UE according to the second TAM.

In this embodiment, if a home network communicates with a visited network by using a CS domain on the home network, T_CSI of a called UE is sent to a GMSC, where the T_CSI is used to instruct the GMSC to acquire, by using the CS domain on the home network, a roaming number for routing a call to the visited network, so that the GMSC routes the call to the called UE by using the CS domain on the home network, and service triggering can be controlled by the CS domain instead of being controlled by an IMS domain. Therefore, the visited network does not need to return service information to the home network in real time, and it is ensured that a service of the called UE can be normally triggered.

Figure 5:
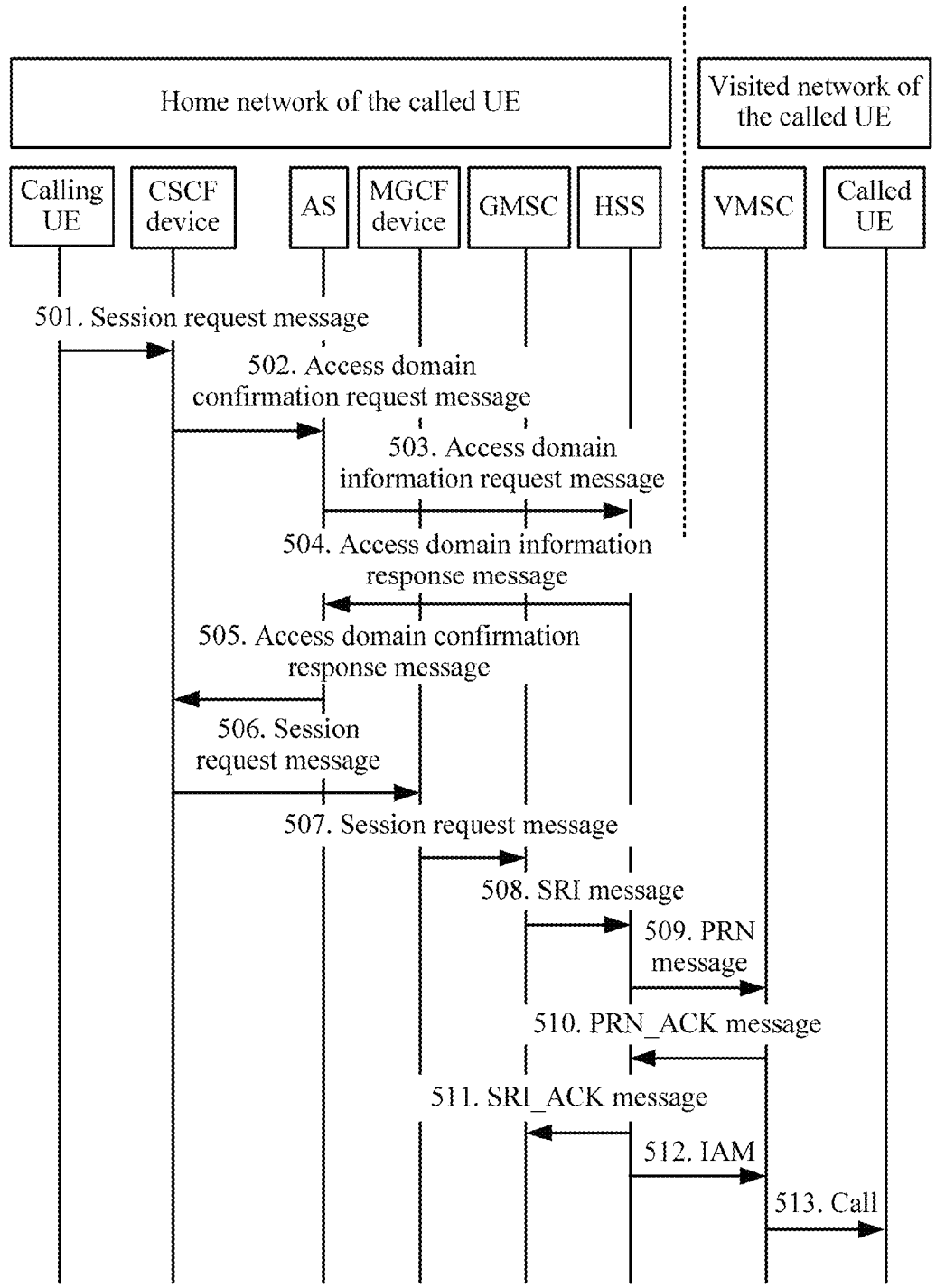
FIG. 5 is a schematic flowchart of a process of a user service processing method according to another embodiment.

FIG. 5 is a schematic flowchart of a process of a user service processing method according to another embodiment. In FIG. 5, it is assumed that a calling UE that initiates a call to a called UE is located in an IMS domain, and the calling UE and the called UE subscribe to a service/services on a same home network.

501. A second UE sends a session request message to a CSCF device, where the session request message may be used to indicate that the calling UE initiates the call to the called UE, and the session request message may carry an identifier of the called UE, such as a called number.

502. The CSCF device sends an access domain confirmation request message to an AS according to the session request message, where the access domain confirmation request message may carry the identifier of the called UE.

503. The AS sends an access domain information request message to an HSS according to the identifier of the called UE, where the access domain information request message is used to request access domain information.

504. The HSS sends the access domain information to the AS according to the access domain information request message.

505. If the access domain information is used to indicate that the home network communicates with a visited network by using a CS domain on the home network, the AS sends an access domain confirmation response message to the CSCF device, where the access domain confirmation response message includes a special number, and the special number is used to instruct to route the call to the visited network by using the CS domain on the home network.

In FIG. 5, it is assumed that the home network of the called UE communicates with the visited network by using the CS domain on the home network, but cannot communicate with the visited network by using an IMS domain on the home network.

In order that the CS domain performs service control, in a case in which the home network communicates with the visited network by using the CS domain on the home network, the AS does not perform service processing, and may generate the special number. The special number may be a number prefix before the called number.

It should be understood that if the access domain information indicates that the home network may communicate with the visited network by using the IMS domain on the home network, the AS may process the call, that is, may perform execution according to an existing procedure for processing a call service by an IMS domain.

506. The CSCF device sends the session request message to an MGCF device according to the special number.

In other words, the CSCF device routes the call to the MGCF device according to the special number.

507. The MGCF device sends the session request message to a GMSC.

Specifically, the MGCF device routes the call to the GMSC.

Step 508 to step 513 are similar to step 405 to step 410 in FIG. 4, and details are not described again.

In this embodiment, if a home network communicates with a visited network by using a CS domain on the home network, an access domain confirmation response message sent by an AS to a CSCF device includes a special number, and the special number is used to instruct to route a call to the visited network by using the CS domain on the home network, so that service triggering can be controlled by the CS domain instead of being controlled by an IMS domain. Therefore, the visited network does not need to return related information about a service to the home network in real time, and it is ensured that the service of the called UE can be normally triggered.

Figure 6:
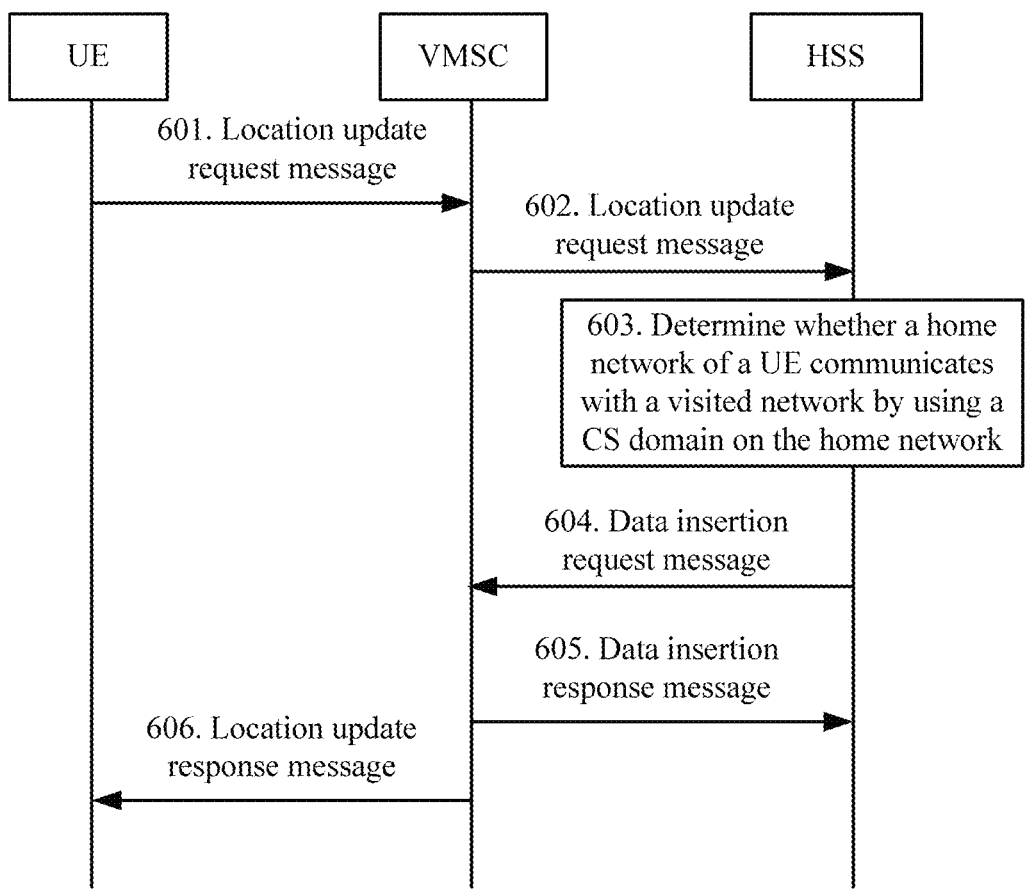
FIG. 6 is a schematic flowchart of a process of a user service processing method according to another embodiment.

FIG. 6 is a schematic flowchart of a process of a user service processing method according to another embodiment. In FIG. 6, an HSS is located on a home network of a UE.

601. The UE sends a location update request message to a VMSC, where the location update request message carries an identifier of the UE.

Specifically, the location update request message may be used to indicate that the UE requests to register with a visited network. When the UE roams to the visited network, there is no information about the UE on the visited network. Therefore, the UE needs to complete registration with the visited network by initiating a location update request. In this case, the UE can use a service by using the visited network.

602. The VMSC sends the location update request message of the UE to the HSS.

603. The HSS determines, according to the identifier of the UE, whether the home network of the UE communicates with a visited network by using a CS domain on the home network.

The location update request message may further include a number of a VLR. The HSS may determine, according to the number of the VLR, whether the home network of the UE communicates with the visited network by using the CS domain on the home network.

For a specific process, refer to step 403 in FIG. 4, and details are not described again.

604. If the home network communicates with the visited network by using the CS domain on the home network, the HSS sends a data insertion request message to the VMSC, where the data insertion request message includes subscriber information stored when the UE subscribes to a service on the home network.

For example, the subscriber information includes information about the service to which the UE subscribes on the home network. The service to which the UE subscribes on the home network may include a late forwarding service.

It should be understood that if the home network may communicate with the visited network by using an IMS domain on the home network, the subscriber information in the data insertion request message may not include information about a late forwarding service.

605. After saving the subscriber information of the UE, the VMSC sends a data insertion response message to the HSS.

After the VMSC saves the subscriber information of the UE, registration of the UE with the visited network is completed.

606. The VMSC sends a location update response message to the UE, where the location update response message is used to indicate a location update success of the UE.

In this embodiment, if it is determined that a home network communicates with a visited network by using a CS domain on the home network, a data insertion request message is sent to a VMSC, where the data insertion request message carries subscriber information stored when a UE subscribes to a service on the home network, so that the VMSC can control triggering of a service of the UE according to the subscriber information, and it is ensured that the service of the UE can be normally triggered.

Figure 7:
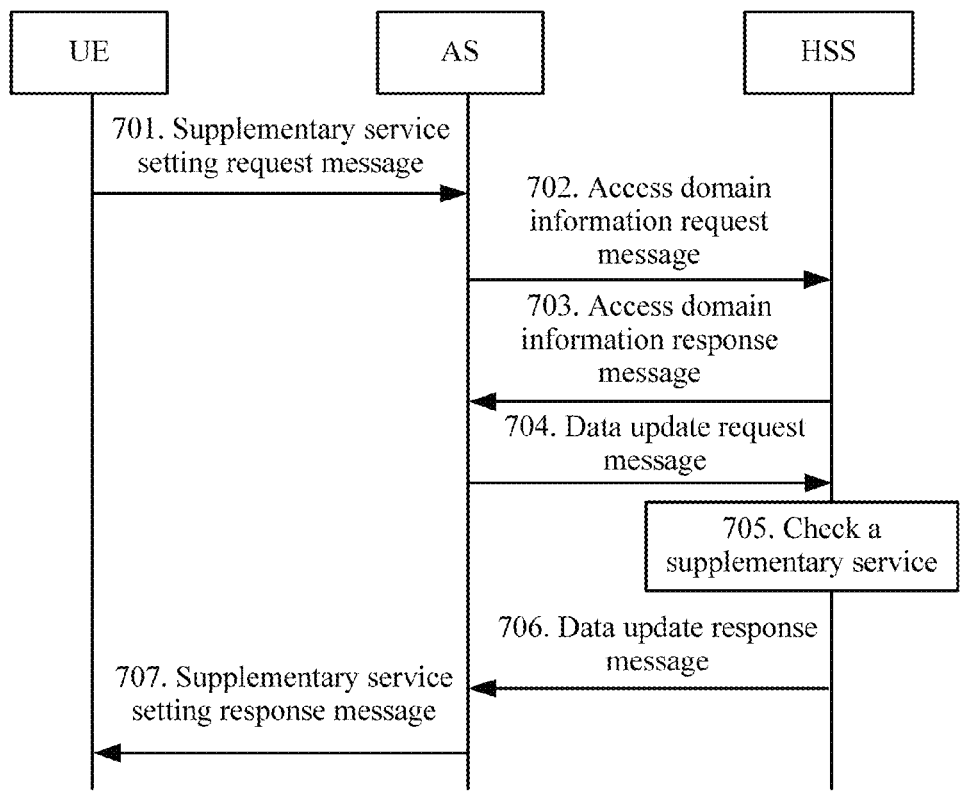
FIG. 7 is a schematic flowchart of a process of a user service processing method according to another embodiment.

FIG. 7 is a schematic flowchart of a process of a user service processing method according to another embodiment. In FIG. 7, an AS and an HSS are both located on a home network of a UE.

701. The UE sends a supplementary service setting request message to the AS by using a Ut interface, where the supplementary service setting request message is used to indicate that the UE requests to set a supplementary service.

702. After receiving the supplementary service setting request message, the AS sends an access domain information request message to the HSS, where the access domain information request message is used to request access domain information.

703. The HSS sends an access domain information response message to the AS, where the access domain information response message carries the access domain information.

704. If the access domain information indicates that the home network communicates with a visited network by using a CS domain on the home network, the AS does not check the supplementary service, and sends a data update request message to the HSS.

In FIG. 7, it is assumed that the home network of the UE communicates with the visited network by using the CS domain on the home network, but cannot communicate with the visited network by using an IMS domain on the home network.

The data update request message may be used to indicate that the UE requests to set the supplementary service. For example, the data update request message may carry an identifier of the UE and information about the supplementary service.

705. The HSS checks the supplementary service.

706. The HSS sends a data update response message to the AS.

The data update response message carries an identifier of successfully setting the supplementary service or an identifier of failing to set the supplementary service.

In step 705, if the check of the HSS on the supplementary service is successful, the information about the supplementary service is saved; in this case, the data update response message carries the identifier of successfully setting the supplementary service. If the detection of the HSS on the supplementary service fails, the data update response message carries the identifier of failing to set the supplementary service.

707. The AS sends a supplementary service setting response message to the UE.

If the data update response message carries the identifier of successfully setting the supplementary service, the supplementary service setting response message carries the identifier of successfully setting the supplementary service; if the data update response message carries the identifier of failing to set the supplementary service, the supplementary service setting response message carries the identifier of failing to set the supplementary service.

It should be understood that if the access domain information indicates that the home network may communicate with the visited network by using the IMS domain on the home network, the AS checks the supplementary service, the AS may send the information about the checked supplementary service to the HSS, and the HSS may save the information about the supplementary service. In this case, the HSS does not check the supplementary service.

In this embodiment, if an AS determines that a home network communicates with a visited network by using a CS domain on the home network, the AS does not check a supplementary service, and sends a data update request message to an HSS on the home network, so that the HSS checks the supplementary service, which can avoid that the supplementary service is checked by using two check criteria, so that supplementary service inconsistency can be avoided.

Figure 8:
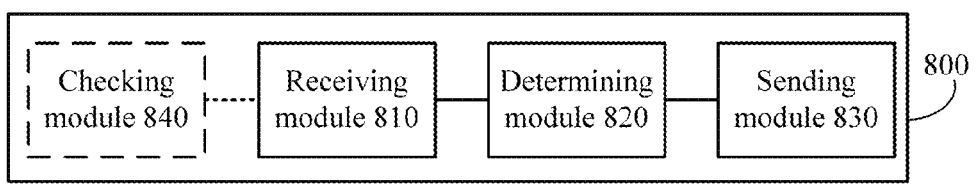
FIG. 8 is a schematic block diagram of a call control device according to an embodiment.

FIG. 8 is a schematic block diagram of a call control device according to an embodiment. In FIG. 8, a call control device 800 is located on a home network of a called UE. The call control device 800 includes a receiving module 810, a determining module 820, and a sending module 830.

When a call is being initiated to the called UE, the receiving module 810 receives an access domain confirmation request message sent by a call routing device on the home network, where the access domain confirmation request message carries an identifier of the called UE. The determining module 820 determines, according to the identifier of the called UE received by the receiving module 810, that the home network communicates with a visited network of the called UE by using a CS domain on the home network. After the determining module 820 determines that the home network communicates with the visited network by using the CS domain on the home network, the sending module 830 sends an access domain confirmation response message to the call routing device, where the access domain confirmation response message carries instruction information, and the instruction information is used to instruct the call routing device to route the call to the visited network by using the CS domain on the home network.

In this embodiment, a call control device receives, from a call routing device, an access domain confirmation request message that carries an identifier of a called UE, and determines, according to the identifier of the called UE, that a home network of the called UE communicates with a visited network of the called UE by using a CS domain on the home network. Therefore, the call control device sends an access domain confirmation response message that carries instruction information to the call routing device to instruct the call routing device to route a call to the visited network by using the CS domain on the home network, so that service triggering can be controlled by the CS domain instead of being controlled by an IMS domain. Therefore, the visited network does not need to return service information to the home network in real time, and it is ensured that a service of the called UE can be normally triggered.

Optionally, in an embodiment, the call control device 800 may be an HSS, and the call routing device may be a GMSC.

Optionally, in another embodiment, the sending module 830 may send the access domain confirmation response message to the call routing device, where the access domain confirmation response message carries T_CSI, and the T_CSI is used to instruct the call routing device to acquire, by using the CS domain, a roaming number for routing the call to the visited network.

Optionally, in another embodiment, the receiving module 810 may further receive a location update request message sent by a VMSC on the visited network, where the location update request message carries the identifier of the called UE.

If the home network communicates with the visited network by using the CS domain on the home network, the sending module 830 may further send a data insertion request message to the VMSC according to the identifier of the called UE received by the receiving module 810, where the data insertion request message carries subscriber information stored when the called UE subscribes to a service on the home network, so as to instruct the VMSC to perform registration of the called UE with the visited network according to the subscriber information.

Optionally, in another embodiment, the location update request message may include a number of a VLR.

The determining module 820 may determine a roaming agreement between the visited network and the home network according to the number of the VLR and a correspondence between the number of the VLR and the roaming agreement, and may determine, according to the roaming agreement between the visited network and the home network, that the home network communicates with the visited network by using the CS domain on the home network.

Optionally, in another embodiment, the foregoing subscriber information may include information about a late forwarding service.

Optionally, in another embodiment, the call control device 800 may further include a checking module 840.

The receiving module 810 may further receive a data update request message sent by an AS on the home network, where the data update request message is used to indicate that the called UE requests to set a supplementary service.

The checking module 840 may check the supplementary service if the home network communicates with the visited network by using the CS domain on the home network. The sending module 830 may further send a data update response message to the AS, where the data update response message carries an identifier of successfully setting the supplementary service or an identifier of failing to set the supplementary service.

Optionally, in another embodiment, the call control device may be an AS, and the call routing device may be a CSCF device.

Optionally, in another embodiment, the sending module 830 may send the access domain confirmation response message to the call routing device, where the access domain confirmation response message carries a special number, and the special number is used to instruct the call routing device to route the call to the visited network by using the CS domain on the home network.

Optionally, in another embodiment, the sending module 830 may further send an access domain information request message to an HSS, where the access domain information request message carries the identifier of the called UE. The receiving module 810 may further receive an access domain information response message sent by the HSS, where the access domain information response message carries access domain information, and the access domain information is used to indicate that the home network communicates with the visited network by using the CS domain on the home network.

Optionally, in another embodiment, the receiving module 810 may further receive a supplementary service setting request message sent by the called UE, where the supplementary service setting request message is used to indicate that the called UE requests to set a supplementary service.

If the home network communicates with the visited network by using the CS domain on the home network, the sending module 830 may further send a data update request message to the HSS, where the data update request message is used to indicate that the called UE requests to set the supplementary service.

The receiving module 810 may further receive a data update response message sent by the HSS, where the data update response message carries an identifier of successfully setting the supplementary service or an identifier of failing to set the supplementary service.

The sending module 830 may further send a supplementary service setting response message to the called UE, where the supplementary service setting response message carries the identifier of successfully setting the supplementary service or the identifier of failing to set the supplementary service.

For specific functions and operations of the call control device 800, refer to the process related to the call control device in the method embodiments of FIG. 2 and FIG. 4 to FIG. 7. To avoid repetition, details are not described herein again.

Figure 9:
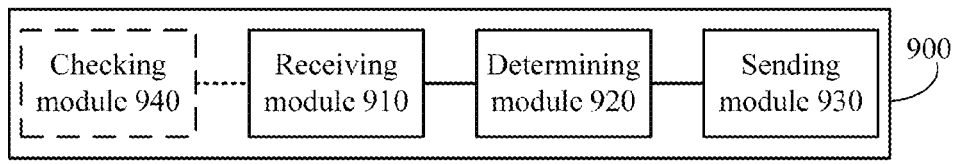
FIG. 9 is a schematic block diagram of an HSS according to an embodiment.

FIG. 9 is a schematic block diagram of an HSS according to an embodiment of the present invention. In FIG. 9, an HSS 900 is located on a home network of a UE. The HSS 900 includes a receiving module 910, a determining module 920, and a sending module 930.

The receiving module 910 receives a location update request message sent by a VMSC on a visited network of the UE, where the location update request message carries an identifier of the UE. The determining module 920 determines, according to the identifier of the UE received by the receiving module 910, whether the home network communicates with the visited network by using a CS domain on the home network. If the determining module 920 determines that the home network communicates with the visited network by using the CS domain on the home network, the sending module 930 sends a data insertion request message to the VMSC, where the data insertion request message carries subscriber information stored when the UE subscribes to a service on the home network, so as to instruct the VMSC to perform registration of the UE with the visited network according to the subscriber information.

In this embodiment, if it is determined that a home network communicates with a visited network by using a CS domain on the home network, a data insertion request message is sent to a VMSC, where the data insertion request message carries subscriber information stored when a UE subscribes to a service on the home network, so that the VMSC can control triggering of a service of the UE according to the subscriber information, and it is ensured that the service of the UE can be normally triggered.

Optionally, in an embodiment, the location update request message includes a number of a visitor location register VLR. The determining module 920 may determine a roaming agreement between the visited network and the home network according to the number of the VLR and a correspondence between the number of the VLR and the roaming agreement, and then may determine, according to the roaming agreement between the visited network and the home network, that the home network communicates with the visited network by using the CS domain on the home network.

Optionally, in another embodiment, the subscriber information may include information about a late forwarding service.

Optionally, in another embodiment, the HSS 900 may further include a checking module 940.

The receiving module 910 may further receive a data update request message sent by an AS on the home network, where the data update request message is used to indicate that the UE requests to set a supplementary service. The checking module 940 may check the supplementary service if the home network communicates with the visited network by using the CS domain on the home network. The sending module 930 may further send a data update response message to the AS, where the data update response message carries an identifier of successfully setting the supplementary service or an identifier of failing to set the supplementary service.

For specific functions and operations of the HSS 900 in FIG. 9, refer to the process related to the HSS in the method embodiments of the foregoing FIG. 3a and FIG. 6. To avoid repetition, details are not described herein again.

Figure 10:
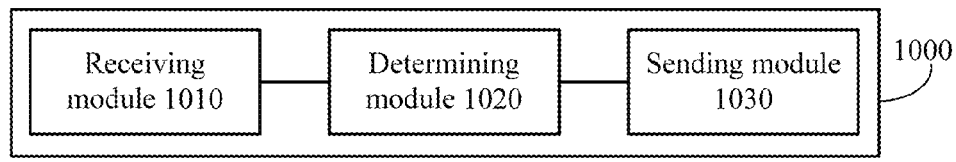
FIG. 10 is a schematic block diagram of an AS according to an embodiment.

FIG. 10 is a schematic block diagram of an AS according to an embodiment of the present invention. In FIG. 10, an AS 1000 is located on a home network of a UE. The AS 1000 includes a receiving module 1010, a determining module 1020, and a sending module 1030.

The receiving module 1010 receives a supplementary service setting request message sent by the UE, where the supplementary service setting request message is used to indicate that the UE requests to set a supplementary service. The determining module 1020 determines whether the home network communicates with a visited network of the UE by using a CS domain on the home network. The determining module 1020 does not check the supplementary service if the determining module 1020 determines that the home network communicates with the visited network by using the CS domain on the home network. If the determining module 1020 determines that the home network communicates with the visited network by using the CS domain on the home network, the sending module 1030 sends a data update request message to an HSS on the home network, so that the HSS checks the supplementary service according to the data update request message.

In this embodiment, if an AS determines that a home network communicates with a visited network by using a CS domain on the home network, the AS does not check a supplementary service, and sends a data update request message to an HSS on the home network, so that the HSS checks the supplementary service, which can avoid that the supplementary service is checked by using two check criteria, so that supplementary service inconsistency can be avoided.

Optionally, in an embodiment, the sending module 1030 may further send an access domain information request message to the HSS, where the access domain information request message carries an identifier of the UE.

The receiving module 1010 may further receive an access domain information response message sent by the HSS, where the access domain information response message carries access domain information, and the access domain information is used to indicate whether the home network communicates with the visited network by using the CS domain on the home network.

Optionally, in another embodiment, after the sending module 1030 sends the data update request message to the HSS, the receiving module 1010 may further receive a data update response message sent by the HSS, where the data update response message carries an identifier of successfully setting the supplementary service or an identifier of failing to set the supplementary service. The sending module 1030 may further send a supplementary service setting response message to the UE, where the supplementary service setting response message carries the identifier of successfully setting the supplementary service or the identifier of failing to set the supplementary service.

For specific functions and operations of the AS 1000 in FIG. 10, refer to the process related to the AS in the method embodiments of the foregoing FIG. 3b and FIG. 7. To avoid repetition, details are not described herein again.

Figure 11:
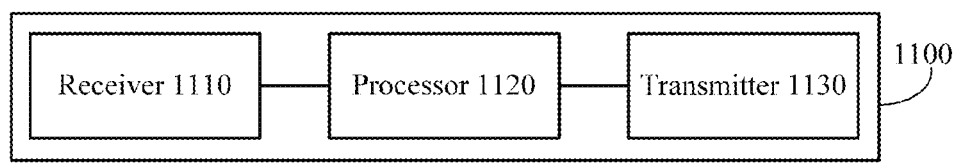
FIG. 11 is a schematic block diagram of a call control device according to another embodiment.

FIG. 11 is a schematic block diagram of a call control device according to another embodiment. In FIG. 11, a call control device 1100 is located on a home network of a called UE. The call control device 1100 includes a receiver 1110, a processor 1120, and a transmitter 1130.

When a call is being initiated to the called UE, the receiver 1110 receives an access domain confirmation request message sent by a call routing device on the home network, where the access domain confirmation request message carries an identifier of the called UE. The processor 1120 determines, according to the identifier of the called UE received by the receiver 1110, that the home network communicates with a visited network of the called UE by using a CS domain on the home network. After the processor 1120 determines that the home network communicates with the visited network by using the CS domain on the home network, the transmitter 1130 sends an access domain confirmation response message to the call routing device, where the access domain confirmation response message carries instruction information, and the instruction information is used to instruct the call routing device to route the call to the visited network by using the CS domain on the home network.

In this embodiment, a call control device receives, from a call routing device, an access domain confirmation request message that carries an identifier of a called UE, and determines, according to the identifier of the called UE, that a home network of the called UE communicates with a visited network of the called UE by using a CS domain on the home network. Therefore, the call control device sends an access domain confirmation response message that carries instruction information to the call routing device to instruct the call routing device to route a call to the visited network by using the CS domain on the home network, so that service triggering can be controlled by the CS domain instead of being controlled by an IMS domain. Therefore, the visited network does not need to return service information to the home network in real time, and it is ensured that a service of the called UE can be normally triggered.

Optionally, in an embodiment, the call control device may be an HSS, and the call routing device may be a GMSC.

Optionally, in another embodiment, the transmitter 1130 may send the access domain confirmation response message to the call routing device, where the access domain confirmation response message carries T_CSI, and the T_CSI is used to instruct the call routing device to acquire, by using the CS domain, a roaming number for routing the call to the visited network.

Optionally, in another embodiment, the receiver 1110 may further receive a location update request message sent by a VMSC on the visited network, where the location update request message carries the identifier of the called UE.

If the home network communicates with the visited network by using the CS domain on the home network, the transmitter 1130 may further send a data insertion request message to the VMSC according to the identifier of the called UE, where the data insertion request message carries subscriber information stored when the called UE subscribes to a service on the home network, so as to instruct the VMSC to perform registration of the called UE with the visited network according to the subscriber information.

Optionally, in another embodiment, the location update request message may include a number of a VLR.

The processor 1120 may determine a roaming agreement between the visited network and the home network according to the number of the VLR and a correspondence between the number of the VLR and the roaming agreement, and may determine, according to the roaming agreement between the visited network and the home network, that the home network communicates with the visited network by using the CS domain on the home network.

Optionally, in another embodiment, the foregoing subscriber information may include information about a late forwarding service.

Optionally, in another embodiment, the receiver 1110 may further receive a data update request message sent by an AS on the home network, where the data update request message is used to indicate that the called UE requests to set a supplementary service. The processor 1120 may check the supplementary service if the home network communicates with the visited network by using the CS domain on the home network. The transmitter 1130 may further send a data update response message to the AS, where the data update response message carries an identifier of successfully setting the supplementary service or an identifier of failing to set the supplementary service.

Optionally, in another embodiment, the call control device may be an AS, and the call routing device may be a CSCF device.

Optionally, in another embodiment, the transmitter 1130 may send the access domain confirmation response message to the call routing device, where the access domain confirmation response message carries a special number, and the special number is used to instruct the call routing device to route the call to the visited network by using the CS domain on the home network.

Optionally, in another embodiment, the transmitter 1130 may further send an access domain information request message to an HSS, where the access domain information request message carries the identifier of the called UE. The receiver 1110 may further receive an access domain information response message sent by the HSS, where the access domain information response message carries access domain information, and the access domain information is used to indicate that the home network communicates with the visited network by using the CS domain on the home network.

Optionally, in another embodiment, the receiver 1110 may further receive a supplementary service setting request message sent by the called UE, where the supplementary service setting request message is used to indicate that the called UE requests to set a supplementary service.

If the home network communicates with the visited network by using the CS domain on the home network, the transmitter 1130 may further send a data update request message to the HSS, where the data update request message is used to indicate that the called UE requests to set the supplementary service.

The receiver 1110 may further receive a data update response message sent by the HSS, where the data update response message carries an identifier of successfully setting the supplementary service or an identifier of failing to set the supplementary service.

The transmitter 1130 may further send a supplementary service setting response message to the called UE, where the supplementary service setting response message carries the identifier of successfully setting the supplementary service or the identifier of failing to set the supplementary service.

For specific functions and operations of the call control device 1100, refer to the process related to the call control device in the method embodiments of FIG. 2 and FIG. 4 to FIG. 7. To avoid repetition, details are not described herein again.

Figure 12:
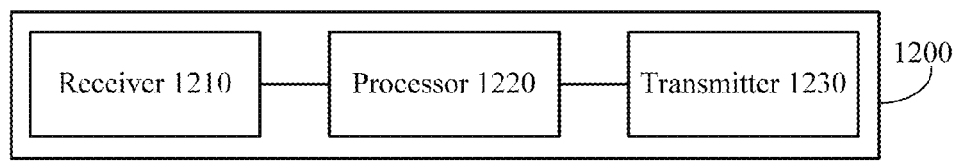
FIG. 12 is a schematic block diagram of an HSS according to another embodiment.

FIG. 12 is a schematic block diagram of an HSS according to another embodiment of the present invention. In FIG. 12, an HSS 1200 is located on a home network of a UE. The HSS 1200 includes a receiver 1210, a processor 1220, and a transmitter 1230.

The receiver 1210 receives a location update request message sent by a VMSC on a visited network of the UE, where the location update request message carries an identifier of the UE. The processor 1220 determines, according to the identifier of the UE received by the receiver 1210, whether the home network communicates with the visited network by using a CS domain on the home network. If the processor 1220 determines that the home network communicates with the visited network by using the CS domain on the home network, the transmitter 1230 sends a data insertion request message to the VMSC, where the data insertion request message carries subscriber information stored when the UE subscribes to a service on the home network, so as to instruct the VMSC to perform registration of the UE with the visited network according to the subscriber information.

In this embodiment, if it is determined that a home network communicates with a visited network by using a CS domain on the home network, a data insertion request message is sent to a VMSC, where the data insertion request message carries subscriber information stored when a UE subscribes to a service on the home network, so that the VMSC can control triggering of a service of the UE according to the subscriber information, and it is ensured that the service of the UE can be normally triggered.

Optionally, in an embodiment, the location update request message includes a number of a VLR.

The processor 1220 may determine a roaming agreement between the visited network and the home network according to the number of the VLR and a correspondence between the number of the VLR and the roaming agreement, and may determine, according to the roaming agreement between the visited network and the home network, that the home network communicates with the visited network by using the CS domain on the home network.

Optionally, in another embodiment, the subscriber information may include information about a late forwarding service.

Optionally, in another embodiment, the receiver 1210 may further receive a data update request message sent by an application server AS on the home network, where the data update request message is used to indicate that the UE requests to set a supplementary service. The processor 1220 may check the supplementary service if the home network communicates with the visited network by using the CS domain on the home network. The transmitter 1230 may further send a data update response message to the AS, where the data update response message carries an identifier of successfully setting the supplementary service or an identifier of failing to set the supplementary service.

For specific functions and operations of the HSS 1200 in FIG. 12, refer to the process related to the HSS in the method embodiments of the foregoing FIG. 3a and FIG. 6. To avoid repetition, details are not described herein again.

Figure 13:
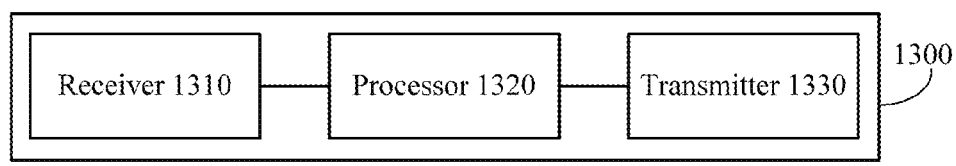
FIG. 13 is a schematic block diagram of an AS according to another embodiment.

FIG. 13 is a schematic block diagram of an AS according to another embodiment of the present invention. In FIG. 13, an AS 1300 is located on a home network of a UE. The AS 1300 includes a receiver 1310, a processor 1320, and a transmitter 1330.

The receiver 1310 receives a supplementary service setting request message sent by the UE, where the supplementary service setting request message is used to indicate that the UE requests to set a supplementary service. The processor 1320 determines whether the home network communicates with a visited network of the UE by using a CS domain on the home network. The processor 1320 does not check the supplementary service if the processor 1320 determines that the home network communicates with the visited network by using the CS domain on the home network. If the processor 1320 determines that the home network communicates with the visited network by using the CS domain on the home network, the transmitter 1330 sends a data update request message to an HSS on the home network, so that the HSS checks the supplementary service according to the data update request message.

In this embodiment, if an AS determines that a home network communicates with a visited network by using a CS domain on the home network, the AS does not check a supplementary service, and sends a data update request message to an HSS on the home network, so that the HSS checks the supplementary service, which can avoid that the supplementary service is checked by using two check criteria, so that supplementary service inconsistency can be avoided.

Optionally, in an embodiment, the transmitter 1330 may further send an access domain information request message to the HSS, where the access domain information request message carries an identifier of the UE.

The receiver 1310 may further receive an access domain information response message sent by the HSS, where the access domain information response message carries access domain information, and the access domain information is used to indicate whether the home network communicates with the visited network by using the CS domain on the home network.

Optionally, in another embodiment, after the transmitter 1330 sends the data update request message to the HSS, the receiver 1310 may further receive a data update response message sent by the HSS, where the data update response message carries an identifier of successfully setting the supplementary service or an identifier of failing to set the supplementary service. The transmitter 1330 may further send a supplementary service setting response message to the UE, where the supplementary service setting response message carries the identifier of successfully setting the supplementary service or the identifier of failing to set the supplementary service.

For specific functions and operations of the AS 1300 in FIG. 13, refer to the process related to the AS in the method embodiments of the foregoing FIG. 3b and FIG. 7. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A call control device, comprising:
    a receiver, configured to: when a call is being initiated to a called user equipment (UE), receive an access domain confirmation request message sent by a call routing device on a home network of the called UE, wherein the access domain confirmation request message carries an identifier of the called UE, and the call control device is located on the home network;
    a processor;
    a non-transitory computer-readable storage medium storing a program to be executed by the processor, the program including instructions for:
        determining, according to the identifier of the called UE received by the receiver, that the home network communicates with a visited network of the called UE using a circuit switched (CS) domain on the home network; and
    a transmitter, configured to: after determining that the home network communicates with the visited network using the CS domain on the home network, send an access domain confirmation response message to the call routing device, wherein the access domain confirmation response message carries instruction information, and the instruction information instructs the call routing device to route the call to the visited network using the CS domain on the home network.

2. The call control device according to claim 1, wherein the call control device is a home subscriber server (HSS), and the call routing device is a gateway mobile switching center (GMSC).

3. The call control device according to claim 2, wherein the access domain confirmation response message carries teminating Customized Applications for Mobile Network Enhanced Logic subscription information T_CSI, and the T_CSI instructs the call routing device to acquire, using the CS domain, a roaming number for routing the call to the visited network.

4. The call control device according to claim 2, wherein:
    the receiver is further configured to receive a location update request message sent by a visited mobile switching center (VMSC) on the visited network, wherein the location update request message carries the identifier of the called UE; and
    the transmitter is further configured to, in response to the home network communicating with the visited network using the CS domain on the home network, send a data insertion request message to the VMSC according to the identifier of the called UE received by the receiver, wherein the data insertion request message carries subscriber information stored when the called UE subscribes to a service on the home network, so as to instruct the VMSC to perform registration of the called UE with the visited network according to the subscriber information.

5. The call control device according to claim 4, wherein the location update request message comprises a number of a visitor location register (VLR); and
    the processor further includes instructions for:
        determining a roaming agreement between the visited network and the home network according to the number of the VLR and a correspondence between the number of the VLR and the roaming agreement; and
        determining, according to the roaming agreement between the visited network and the home network, that the home network communicates with the visited network using the CS domain on the home network.

6. A home subscriber server (HSS), comprising:
    a receiver, configured to receive a location update request message sent by a visited mobile switching center (VMSC) on a visited network of a user equipment (UE), wherein the location update request message carries an identifier of the UE, and the HSS is located on a home network of the UE;
    a processor;
    a non-transitory computer-readable storage medium storing a program to be executed by the processor, the program including instructions for:
        determining, according to the identifier of the UE received by the receiver, whether the home network communicates with the visited network using a circuit switched (CS) domain on the home network; and
    a transmitter, configured to, in response to determining that the home network communicates with the visited network using the CS domain on the home network, send a data insertion request message to the VMSC, wherein the data insertion request message carries subscriber information stored when the UE subscribes to a service on the home network, so as to instruct the VMSC to perform registration of the UE with the visited network according to the subscriber information.

7. The HSS according to claim 6, wherein the location update request message comprises a number of a visitor location register (VLR); and
wherein the processor further includes instructions for:
determining a roaming agreement between the visited network and the home network according to the number of the VLR and a correspondence between the number of the VLR and the roaming agreement; and
determining, according to the roaming agreement between the visited network and the home network, that the home network communicates with the visited network using the CS domain on the home network.

8. The HSS according to claim 6, wherein the subscriber information comprises information about a late forwarding service.

9. The HSS according to claim 8, wherein:
the receiver is further configured to receive a data update request message sent by an application server (AS) on the home network, wherein the data update request message indicates that the UE requests to set a supplementary service;
the program further includes instructions for checking the supplementary service if the home network communicates with the visited network using the CS domain on the home network; and
the transmitter is further configured to send a data update response message to the AS, wherein the data update response message carries an identifier of successfully setting the supplementary service or an identifier of failing to set the supplementary service.

10. An application server (AS), comprising:
a receiver, configured to receive a supplementary service setting request message sent by a user equipment (UE), wherein the supplementary service setting request message indicates that the UE requests to set a supplementary service, and the AS is located on a home network of the UE;
a processor;
a non-transitory computer-readable storage medium storing a program to be executed by the processor, the program including instructions for:
determining whether the home network communicates with a visited network of the UE by using a circuit switched (CS) domain on the home network; and
skipping checking the supplementary service in response to determining that the home network communicates with the visited network using the CS domain on the home network; and
a transmitter, configured to, in response to determining that the home network communicates with the visited network using the CS domain on the home network, send a data update request message to a home subscriber server (HSS) on the home network, so that the HSS checks the supplementary service according to the data update request message.

11. The AS according to claim 10, wherein:
the transmitter is further configured to send an access domain information request message to the HSS, wherein the access domain information request message carries an identifier of the UE; and
the receiver is further configured to receive an access domain information response message sent by the HSS, wherein the access domain information response message carries access domain information, and the access domain information indicates whether the home network communicates with the visited network by using the CS domain on the home network.

12. The AS according to claim 10, wherein:
the receiver is further configured to, after the transmitter sends the data update request message to the HSS, receive a data update response message sent by the HSS, wherein the data update response message carries an identifier of successfully setting the supplementary service or an identifier of failing to set the supplementary service; and
the transmitter is further configured to send a supplementary service setting response message to the UE, wherein the supplementary service setting response message carries the identifier of successfully setting the supplementary service or the identifier of failing to set the supplementary service.

13. A method, comprising:
when a call is being initiated to a called user equipment (UE), receiving, by a call control device on a home network of the called UE, an access domain confirmation request message sent by a call routing device on the home network of the called UE, wherein the access domain confirmation request message carries an identifier of the called UE;
determining, by the call control device according to the identifier of the called UE, that the home network communicates with a visited network of the called UE using a circuit switched (CS) domain on the home network; and
sending, by the call control device, an access domain confirmation response message to the call routing device, wherein the access domain confirmation response message carries instruction information, and the instruction information is used to instruct the call routing device to route the call to the visited network using the CS domain on the home network.

14. The method according to claim 13, wherein the call control device is a home subscriber server (HSS), and the call routing device is a gateway mobile switching center (GMSC).

15. The method according to claim 14, wherein sending the access domain confirmation response message to the call routing device comprises:
sending, by the call control device, the access domain confirmation response message to the call routing device, wherein the access domain confirmation response message carries teminating Customized Applications for Mobile network Enhanced Logic subscription information T_CSI, and the T_CSI instructs the call routing device to acquire, using the CS domain, a roaming number for routing the call to the visited network.

16. The method according to claim 14, further comprising:
receiving, by the call control device, a location update request message sent by a visited mobile switching center (VMSC) on the visited network, wherein the location update request message carries the identifier of the called UE; and
in response to the home network communicating with the visited network using the CS domain on the home network, sending, by the call control device, a data insertion request message to the VMSC according to the identifier of the called UE, wherein the data insertion request message carries subscriber information stored when the called UE subscribes to a service on the home network, so as to instruct the VMSC to perform registration of the called UE with the visited network according to the subscriber information.

17. A method, comprising:

receiving, by a home subscriber server (HSS) on a home network of user equipment UE, a location update request message sent by a visited mobile switching center (VMSC) on a visited network of the UE, wherein the location update request message carries an identifier of the UE;

determining, by the HSS according to the identifier of the UE, whether the home network communicates with the visited network using a circuit switched (CS) domain on the home network; and in response to the HSS determining that the home network communicates with the visited network using the CS domain on the home network, sending, by the HSS, a data insertion request message to the VMSC, wherein the data insertion request message carries subscriber information stored when the UE subscribes to a service on the home network, so as to instruct the VMSC to perform registration of the UE with the visited network according to the subscriber information.

18. The method according to claim 17, wherein:

the location update request message comprises a number of a visitor location register VLR; and determining whether the home network communicates with the visited network using a switched circuit (CS) domain on the home network comprises:

determining, by the HSS, a roaming agreement between the visited network and the home network according to the number of the VLR and a correspondence between the number of the VLR and the roaming agreement; and determining, by the HSS according to the roaming agreement between the visited network and the home network, that the home network communicates with the visited network by using the CS domain on the home network.

19. The method according to claim 17, wherein the subscriber information comprises a late forwarding service.

20. A method, comprising:

receiving, by an application server (AS) on a home network of user equipment UE, a supplementary service setting request message sent by the UE, wherein the supplementary service setting request message indicates that the UE requests to set a supplementary service;

determining, by the AS, whether the home network communicates with a visited network of the UE using a circuit switched (CS) domain on the home network; and in response to the AS determining that the home network communicates with the visited network using the CS domain on the home network, skipping checking, by the AS, the supplementary service, and sending a data update request message to a home subscriber server HSS on the home network, so that the HSS checks the supplementary service according to the data update request message.

21. The method according to claim 20, wherein determining whether the home network communicates with the visited network of the UE using a CS domain on the home network comprises:

sending, by the AS, an access domain information request message to the HSS, wherein the access domain information request message carries an identifier of the UE; and receiving, by the AS, an access domain information response message sent by the HSS, wherein the access domain information response message carries access domain information, and the access domain information indicates whether the home network communicates with the visited network using the circuit switched (CS) domain on the home network.

22. The method according to claim 20, wherein, after the data update request message is sent to the HSS, the method further comprises:

receiving, by the AS, a data update response message sent by the HSS, wherein the data update response message carries an identifier of successfully setting the supplementary service or an identifier of failing to set the supplementary service; and sending, by the AS, a supplementary service setting response message to the UE, wherein the supplementary service setting response message carries the identifier of successfully setting the supplementary service or the identifier of failing to set the supplementary service.

* * * * *